United States Patent
Tamaki et al.

(10) Patent No.: US 8,830,436 B2
(45) Date of Patent: Sep. 9, 2014

(54) PIXEL STRUCTURE, DISPLAY DEVICE, AND ELECTRONIC APPARATUS

(75) Inventors: Masaya Tamaki, Kanagawa (JP); Koichi Nagasawa, Aichi (JP); Shuji Hayashi, Kanagawa (JP); Masaaki Kabe, Kanagawa (JP); Yoko Fukunaga, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 127 days.

(21) Appl. No.: 13/305,316

(22) Filed: Nov. 28, 2011

(65) Prior Publication Data
US 2012/0162594 A1 Jun. 28, 2012

(30) Foreign Application Priority Data
Dec. 24, 2010 (JP) ................................ 2010-287668

(51) Int. Cl.
| | |
|---|---|
| *G02F 1/1343* | (2006.01) |
| *G09G 3/36* | (2006.01) |
| *G02F 1/1362* | (2006.01) |
| *G09G 3/20* | (2006.01) |
| *G02F 1/1333* | (2006.01) |

(52) U.S. Cl.
CPC .... *G02F 1/13624* (2013.01); *G09G 2300/0443* (2013.01); *G09G 3/3648* (2013.01); *G02F 1/136286* (2013.01); *G09G 2300/0857* (2013.01); *G02F 1/136227* (2013.01); *G02F 2203/30* (2013.01); *G02F 2001/134345* (2013.01); *G02F 2001/13629* (2013.01); *G09G 2300/0426* (2013.01); *G09G 3/207* (2013.01); *G02F 2001/133357* (2013.01)
USPC ......................... 349/144; 349/139; 349/143

(58) Field of Classification Search
USPC ..................... 349/54–55, 142–147
See application file for complete search history.

(56) References Cited

U.S. PATENT DOCUMENTS

| | | | |
|---|---|---|---|
| 6,894,754 B2 * | 5/2005 | Ueda | 349/139 |
| 2001/0052889 A1 * | 12/2001 | Fukunishi | 345/87 |
| 2001/0053559 A1 | 12/2001 | Nagao et al. | |
| 2006/0023137 A1 * | 2/2006 | Kamada et al. | 349/44 |
| 2008/0218669 A1 * | 9/2008 | Nishimura et al. | 349/110 |
| 2009/0066893 A1 * | 3/2009 | Tsai et al. | 349/113 |
| 2011/0149172 A1 * | 6/2011 | Tsubata | 348/731 |

FOREIGN PATENT DOCUMENTS

| | | |
|---|---|---|
| JP | 2001-284342 | 10/2001 |
| JP | 2005-300579 | 10/2005 |

* cited by examiner

*Primary Examiner* — Bumsuk Won
*Assistant Examiner* — Charles Chang
(74) *Attorney, Agent, or Firm* — Rader, Fishman & Grauer PLLC

(57) ABSTRACT

A pixel structure includes: a first planarizing film and a second planarizing film laminated in order on a substrate on which a circuit section is formed; and metallic wiring for electrically connecting two electrodes disposed on the second planarizing film to each other so as to be separated from each other, the metallic wiring being formed between the first planarizing film and the second planarizing film.

19 Claims, 22 Drawing Sheets

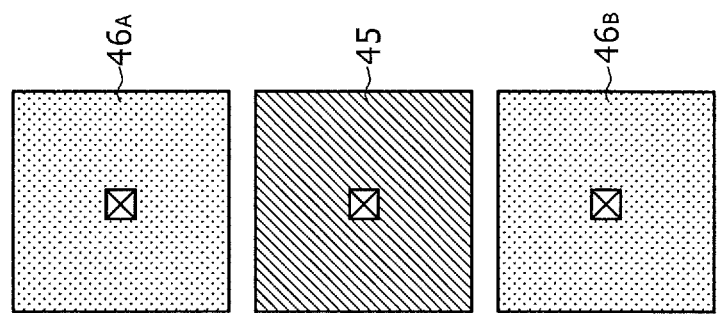
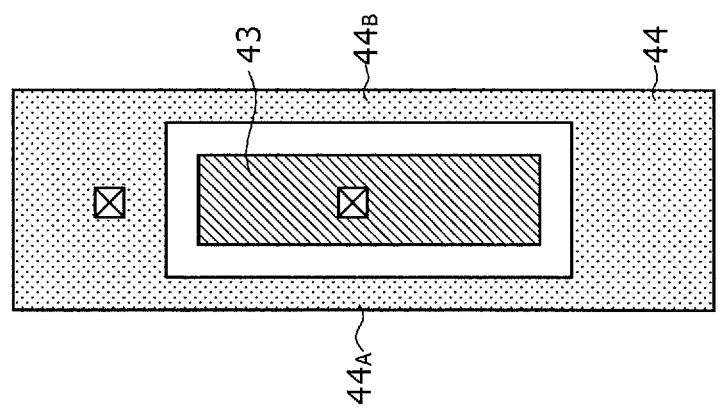
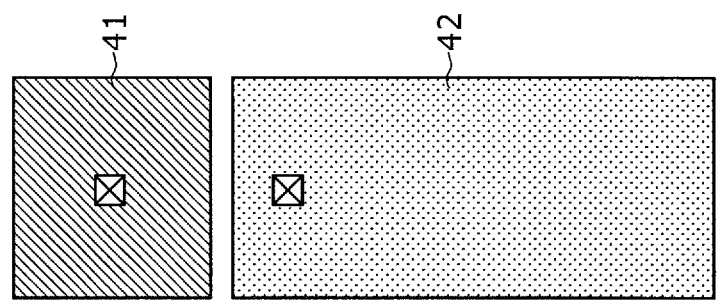

FIG. 9A
FIG. 9C
FIG. 9B
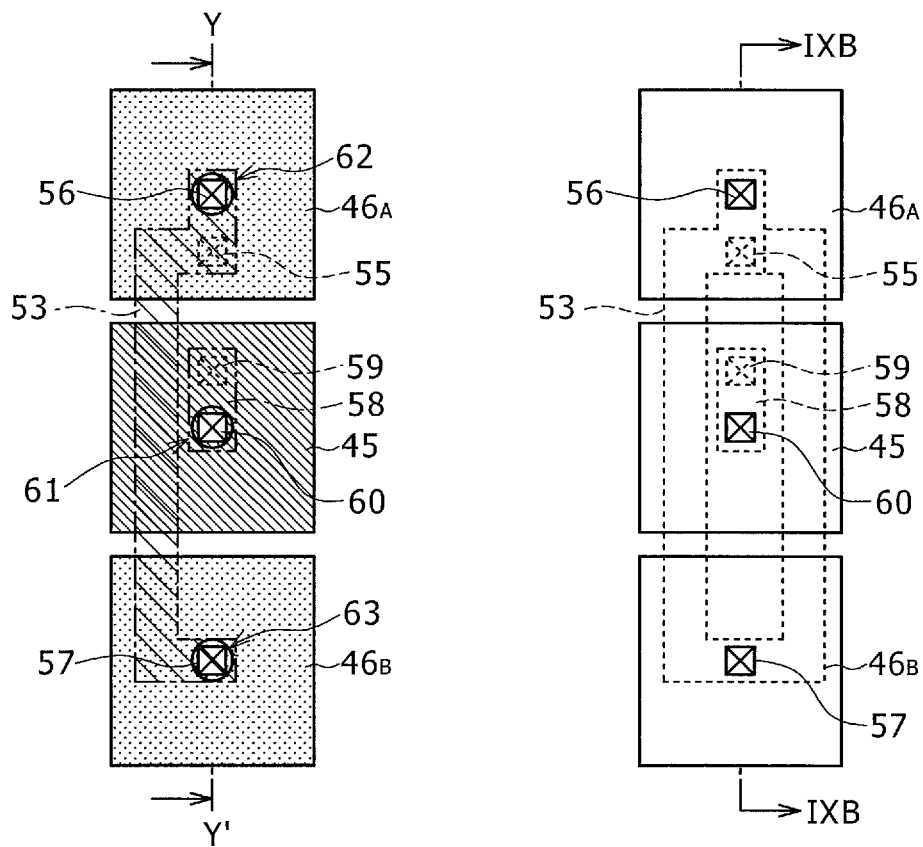
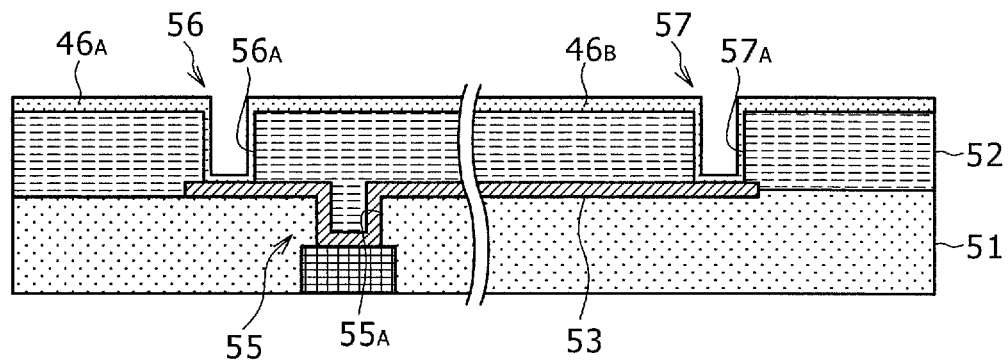

FIG. 10A
FIG. 10C
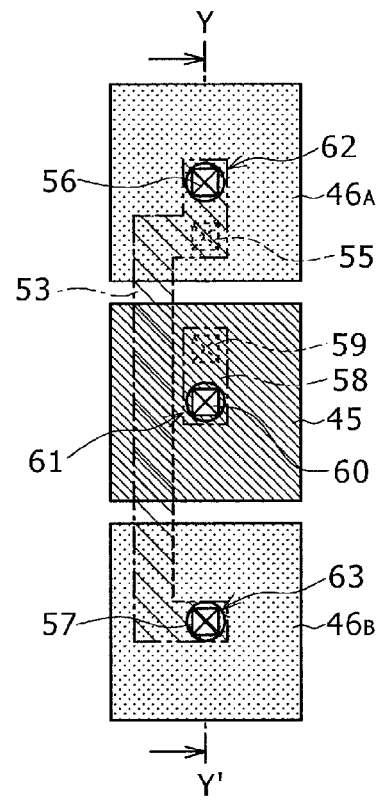
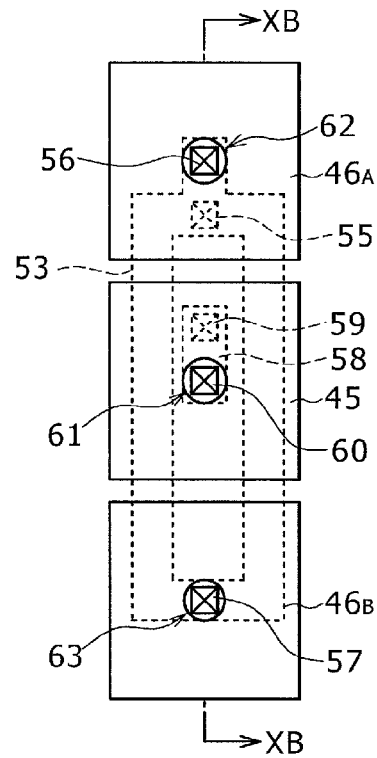
FIG. 10B
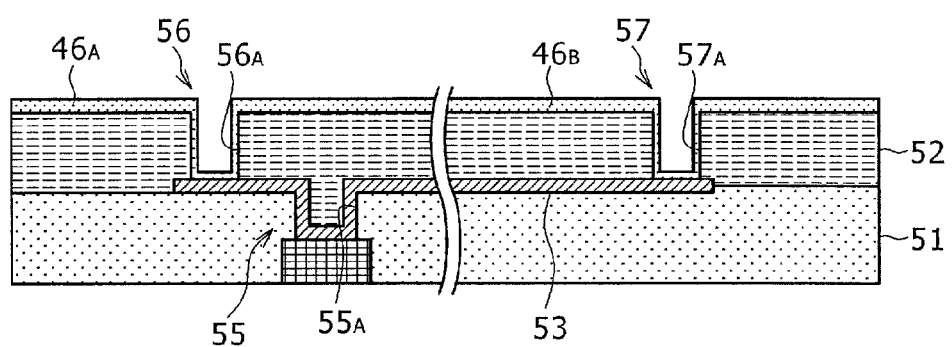

SPECULAR IN APPEARANCE

Ra  11nm
Rpv 72nm

GRANULAR

Ra  85nm
Rpv 469nm

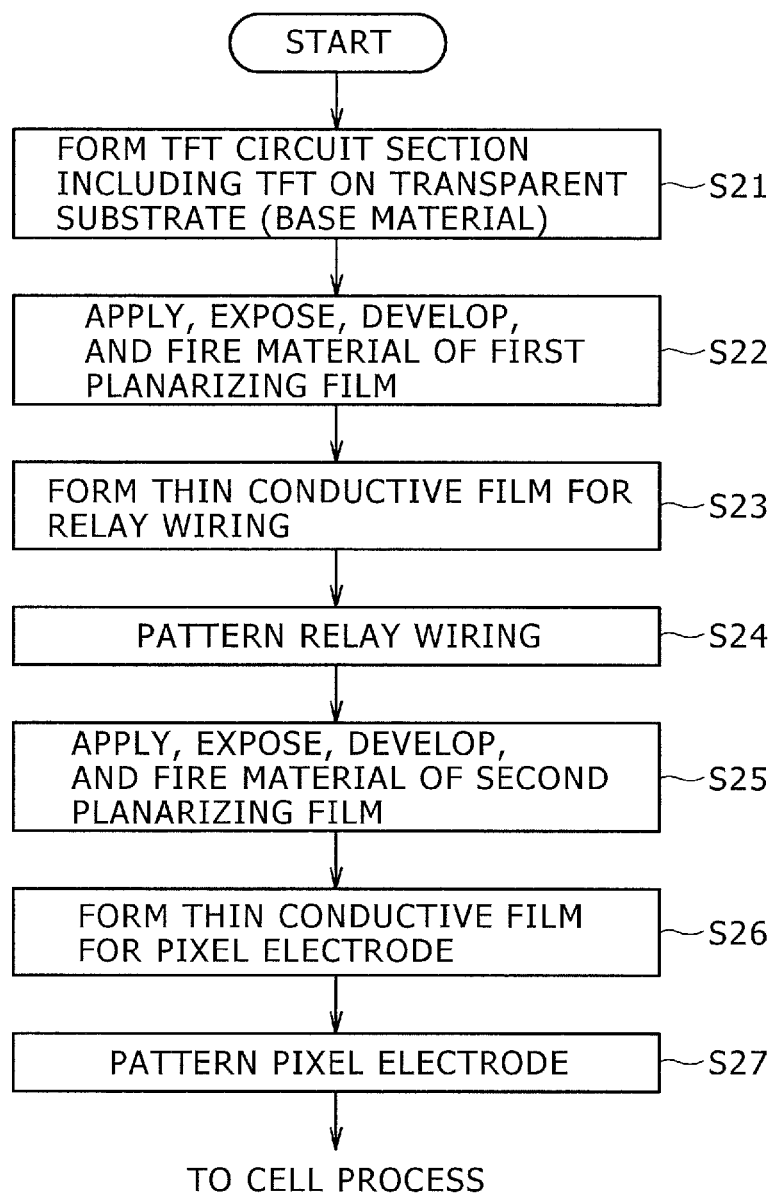

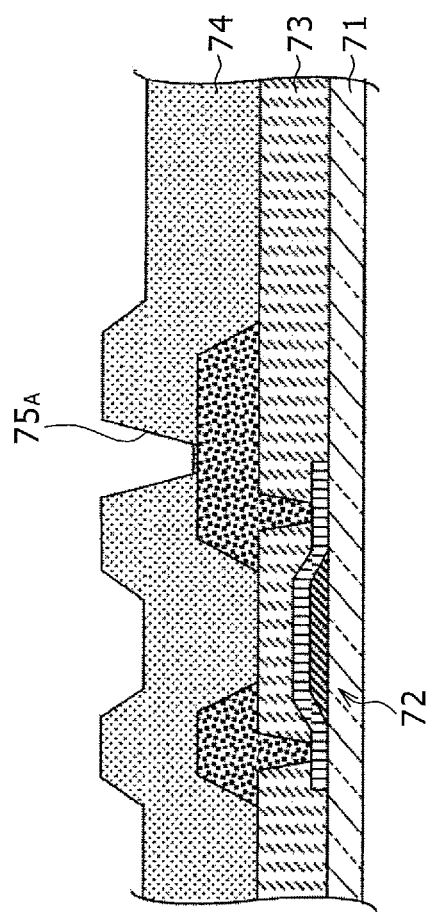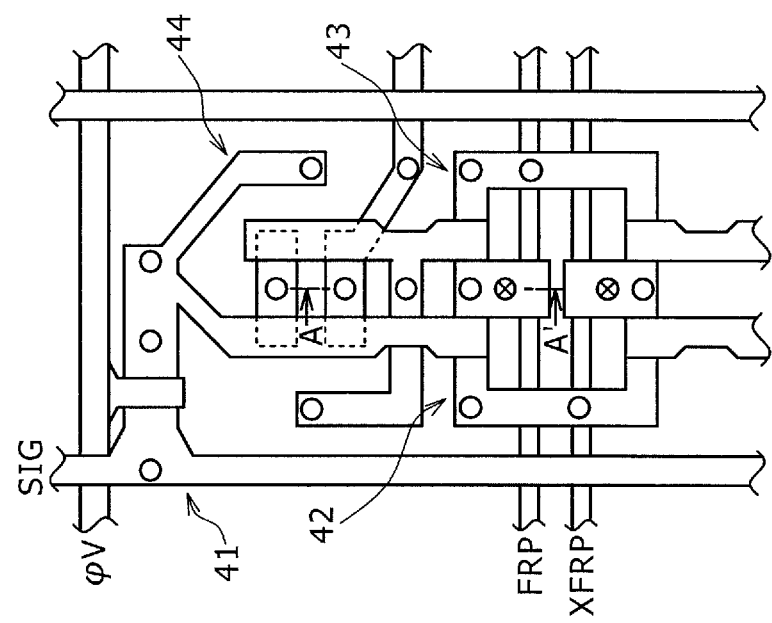

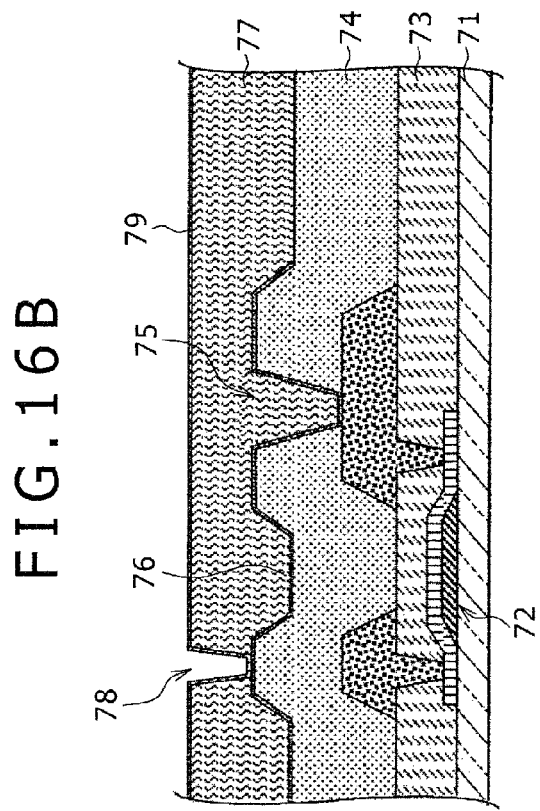
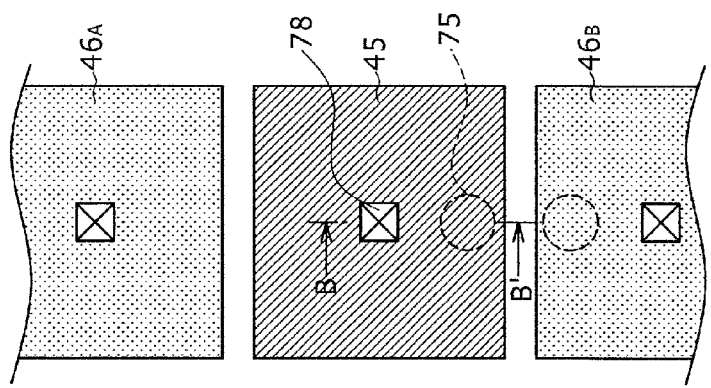

CONTACT HOLE 77
74
73
71

PLANARIZING FILM OF SECOND LAYER   FIRING TEMPERATURE = T

HIGH MELT FLOW  Tg≦T

LOW MELT FLOW  Tg>T

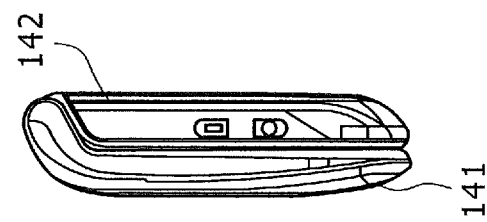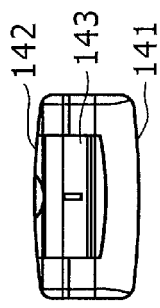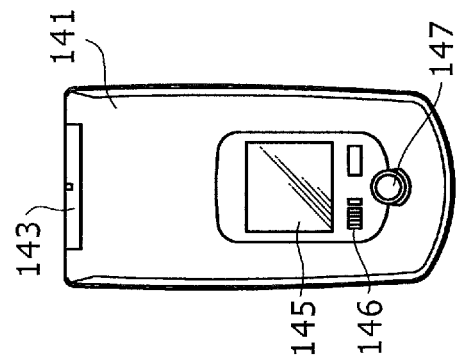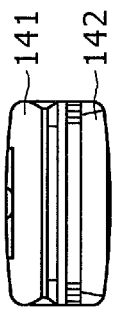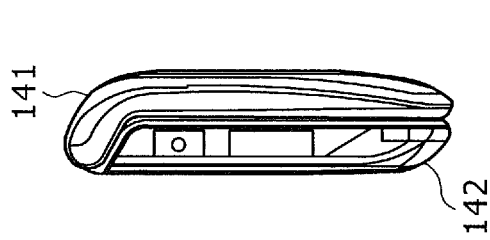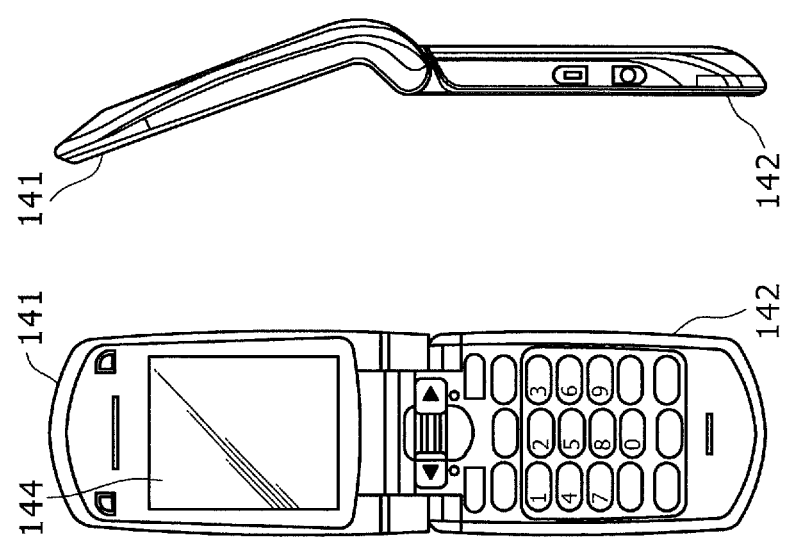

PIXEL STRUCTURE, DISPLAY DEVICE, AND ELECTRONIC APPARATUS

BACKGROUND

The present technology relates to a pixel structure, a display device, and an electronic apparatus, and particularly to a pixel structure employing an area ratio gray scale method, a display device representing gradations by the area ratio gray scale method, and an electronic apparatus having the display device.

A pixel structure employing the area ratio gray scale method to remedy the nonuniformity of image quality due to variations in the characteristics of TFTs (Thin Film Transistors) is known as the pixel structure of a display device, or an active matrix type display device in particular (see Japanese Patent Laid-Open No. 2005-300579, for example).

This area ratio gray scale method divides a pixel electrode as the display region of one pixel (unit pixel) into a plurality of electrodes (hereinafter described as sub-pixel electrodes) weighted in terms of area, and makes gradation display by combinations of these sub-pixel electrodes.

SUMMARY

In a pixel structure employing the area ratio gray scale method, two sub-pixel electrodes may be electrically connected to each other to make the centers of gravity of respective gradations the same (coincide with each other), for example. When the two sub-pixel electrodes are electrically connected to each other, a pixel structure that does not hamper the achievement of higher definition of the display device is desired.

It is accordingly desirable to provide a pixel structure that does not hamper the achievement of higher definition when two sub-pixel electrodes are electrically connected to each other, a display device using the pixel structure, and an electronic apparatus having the display device.

According to an embodiment of the present technology, there is provided a pixel structure including: a first planarizing film and a second planarizing film laminated in order on a substrate on which a circuit section is formed; and metallic wiring for electrically connecting two electrodes disposed on the second planarizing film to each other so as to be separated from each other, the metallic wiring being formed between the first planarizing film and the second planarizing film.

In the pixel structure of the above constitution, the planarizing film formed for a purpose of planarization on the substrate on which the circuit section is formed has a double-layer structure formed by laminating the first planarizing film and the second planarizing film in order. Thereby, the film thickness of each of the first and second planarizing films can be reduced as compared with the film thickness of the planarizing film of a single-layer structure. The two electrodes provided on the second planarizing film so as to be separated from each other are electrically connected to each other by the metallic wiring between the first and second planarizing films via the second planarizing film.

At this time, because the second planarizing film has a small film thickness, a contact base in forming a contact part for the electric connection in the second planarizing film can be made smaller than in a case of forming a contact part in the planarizing film of the single-layer structure. Thereby, the size of the pixel can be reduced as compared with the case of forming a contact part in the planarizing film of the single-layer structure even when the structure is adopted in which structure the metallic wiring is formed between the planarizing films of the double-layer structure and the two electrodes are electrically connected to each other by the metallic wiring via the second planarizing film. Thus, the pixel structure in question does not become a factor in hampering the achievement of higher definition of the display device.

According to another embodiment of the present technology, there is provided a display device formed by arranging a pixel having a pixel structure, the pixel structure including: a first planarizing film and a second planarizing film laminated in order on a substrate on which a circuit section is formed; and metallic wiring for electrically connecting two electrodes disposed on the second planarizing film to each other so as to be separated from each other, the metallic wiring being formed between the first planarizing film and the second planarizing film.

According to a further embodiment of the present technology, there is provided an electronic apparatus having a display device formed by arranging a pixel having a pixel structure, the pixel structure including: a first planarizing film and a second planarizing film laminated in order on a substrate on which a circuit section is formed; and metallic wiring for electrically connecting two electrodes disposed on the second planarizing film to each other so as to be separated from each other, the metallic wiring being formed between the first planarizing film and the second planarizing film.

According to the present technology, it is possible to provide a pixel structure that does not hamper the achievement of higher definition, a display device using the pixel structure, and an electronic apparatus having the display device by adopting a structure in which metallic wiring is arranged between a first and a second planarizing film of a double-layer structure in electrically connecting two electrodes on the second planarizing film to each other and the two electrodes are electrically connected to each other by the metallic wiring.

BRIEF DESCRIPTION OF THE DRAWINGS

FIGS. 7A, 7B, and 7C are diagrams of assistance in explaining pixel divisions in an area ratio gray scale method;

FIGS. 9A, 9B and 9C are diagrams of assistance in explaining a pixel structure according to a first example of a three-part divided pixel employing the area ratio gray scale method, FIG. 9A or 9C being a plan view of three sub-pixel electrodes, and FIG. 9B being a sectional view taken along a line X-X' of FIG. 9A from the direction of arrows;

FIGS. 10A, 10B and 10C are diagrams of assistance in explaining a pixel structure according to a second example of a three-part divided pixel employing the area ratio gray scale method, FIG. 10A or 10C being a plan view of three sub-pixel electrodes, and FIG. 10B being a sectional view taken along a line Y-Y' of FIG. 10A or 10C from the direction of arrows;

FIG. 14 is a flowchart of a process flow of a method for manufacturing the pixel array substrate structure according to the embodiment;

FIGS. 15A and 15B are diagrams of assistance in explaining a pixel circuit in a state in which a planarizing film in a first layer is formed, FIG. 15A being a plan pattern view schematically showing a plan pattern, and FIG. 15B being a sectional structural view taken along a line A-A' of FIG. 15A;

FIGS. 16A and 16B are diagrams of assistance in explaining the pixel circuit after a pixel electrode is formed, FIG. 16A being a plan pattern view schematically showing a plan pattern, and FIG. 16B being a sectional structural view taken along a line B-B' of FIG. 16A;

FIGS. 22A, 22B, 22C, 22D, 22E, 22F, and 22G are external views of a portable telephone to which the present technology is applied, FIG. 22A being a front view of the portable telephone in an opened state, FIG. 22B being a side view of the portable telephone in the opened state, FIG. 22C being a front view of the portable telephone in a closed state, FIG. 22D being a left side view of the portable telephone in the closed state, FIG. 22E being a right side view of the portable telephone in the closed state, FIG. 22F being a top view of the portable telephone in the closed state, and FIG. 22G being a bottom view of the portable telephone in the closed state.

DETAILED DESCRIPTION OF THE PREFERRED EMBODIMENTS

A mode (hereinafter described as an embodiment) for carrying out the technology will hereinafter be described in detail with reference to the drawings. Incidentally, description will be made in the following order.
1. Display Device according to Embodiment
 1-1. System Configuration
 1-2. Pixel Configuration of MIP
 1-3. Rewriting Pixel Data
 1-4. Area Ratio Gray Scale Method
 1-5. Pixel Structure according to Embodiment
 1-6. Specular Reflection
 1-7. Pixel Array Substrate Structure according to Embodiment
2. Examples of Modification
3. Electronic Apparatus <1. Display Device according to Embodiment>

Figure 1:
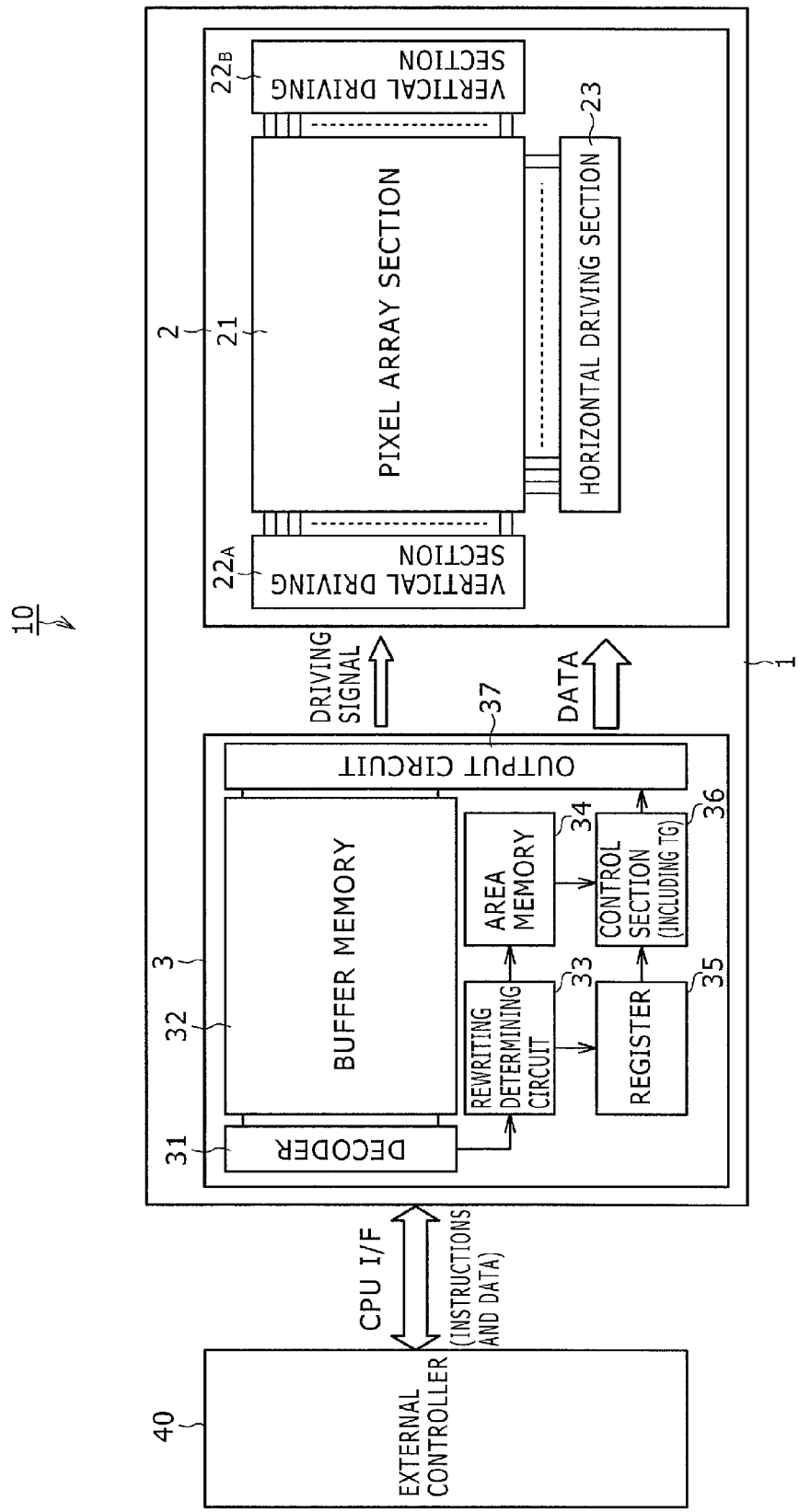
FIG. 1 is a block diagram showing an example of system configuration of a display device according to an embodiment of the present technology.

FIG. 1 is a block diagram showing an example of a system configuration of a display device according to an embodiment of the present technology. Description in the following will be made by taking as an example a reflective type liquid crystal display (LCD) device of a so-called MIP (Memory In Pixel) system having a memory that can store data in each pixel.

The reflective type liquid crystal display device of the MIP system can achieve display in an analog display mode and display in a memory display mode by having a memory for storing data within a pixel. In this case, the analog display mode is a display mode for displaying the gradation of the pixel in an analog manner. The memory display mode is a display mode for displaying the gradation of the pixel in a digital manner on the basis of binary information (logic "1"/logic "0") stored in the memory within the pixel.

In the case of the memory display mode, information retained in the memory is used, and it is therefore not necessary to perform an operation of writing a signal potential reflecting a gradation in frame cycles. Thus, the memory display mode consumes less power than the analog display mode, in which an operation of writing a signal potential reflecting a gradation needs to be performed in frame cycles, that is, the memory display mode makes lower power consumption of the liquid crystal display device possible.

The reflective type liquid crystal display device of the MIP system can represent only two gradations with one bit in each pixel. The reflective type liquid crystal display device of the MIP system according to the present embodiment therefore adopts an area ratio gray scale method as a gradation representing system. The area ratio gray scale method is a gradation representing system that represents four gradations with two bits by assigning for example a 2:1 weight to a pixel area (area of pixel electrodes). Details of the area ratio gray scale method will be described later.

[1-1. System Configuration]

A system configuration of the reflective type liquid crystal display device of the MIP system according to the present embodiment will first be described with reference to FIG. 1.

As shown in FIG. 1, the reflective type liquid crystal display device 10 of the MIP system according to the present embodiment has a modular configuration including a TFT circuit section 2 formed on a transparent substrate (for example a glass substrate) 1 and including a driver IC 3 mounted on the same substrate 1 by a COG (Chip On Glass) method. The reflective type liquid crystal display device (LCD module) 10 of this modular configuration is supplied with various instructions and data from an external controller (or a CPU or the like) 40 via a CPU interface (I/F).

(TFT Circuit Section)

In the LCD module 10, the TFT circuit section 2 includes a pixel array section 21, vertical driving sections $22_A$ and $22_B$, and a horizontal driving section 23. Incidentally, in this case, in regard to the TFT circuit section 2, only minimum necessary functions of the TFT circuit section 2 are shown in a block diagram. The TFT circuit section 2 is not limited to this configuration.

Figure 2:
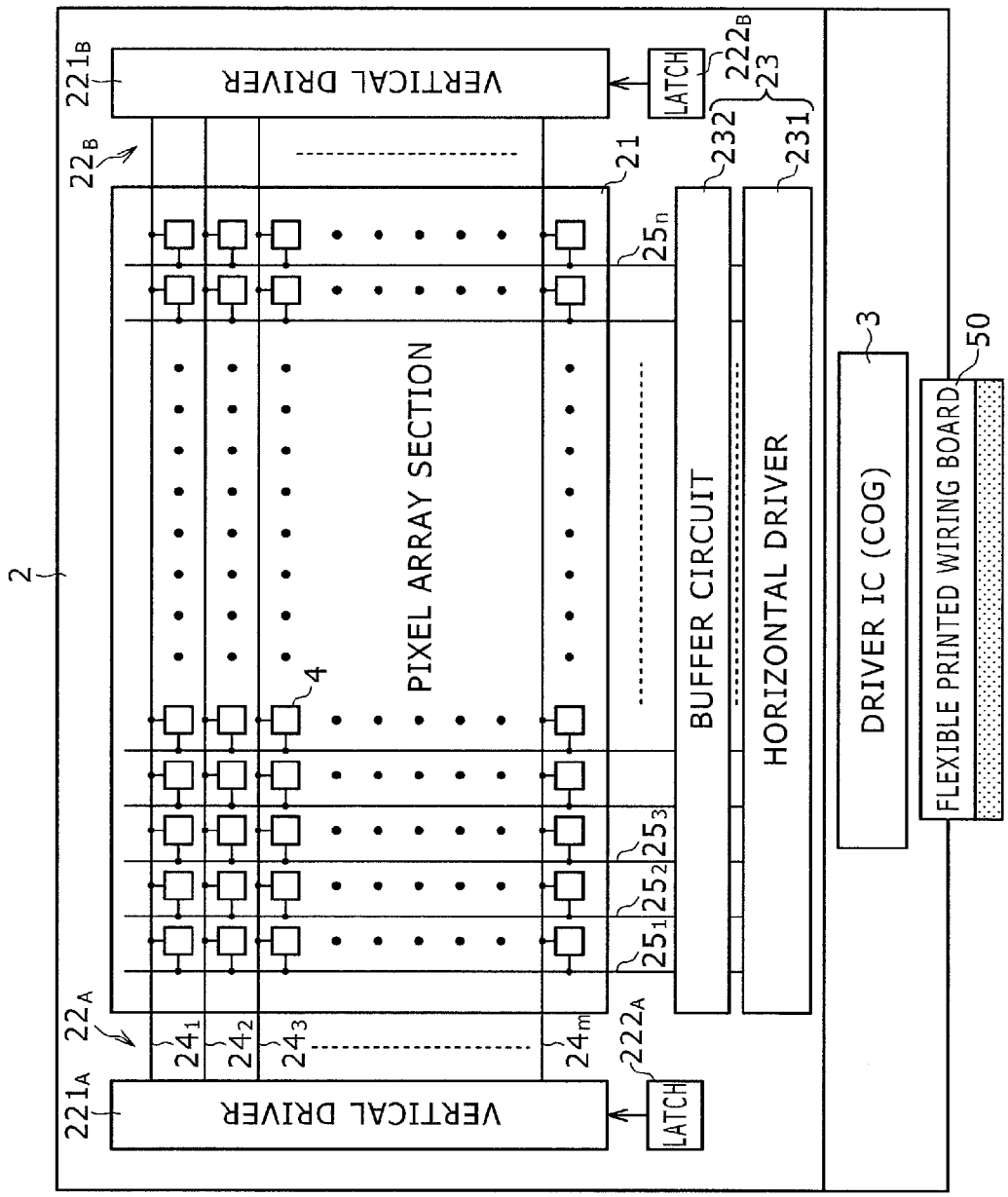
FIG. 2 is a block diagram showing an example of a concrete configuration of a TFT circuit section.

FIG. 2 shows a concrete example of a configuration of the TFT circuit section 2. As shown in FIG. 2, in the pixel array section 21, a display section is formed by two-dimensionally arranging pixels 4 including a memory capable of storing data in the form of a matrix (form of an array). Details of a circuit configuration of a pixel (MIP pixel) 4 including a memory will be described later.

In the pixel array section 21, scanning lines $24_1$ to $24_m$ are arranged along a row direction (direction of arrangement of pixels in pixel rows) for each pixel row in a pixel arrangement of m rows and n columns. The scanning lines $24_1$ to $24_m$ are connected at both ends thereof to respective output terminals in the corresponding rows of the vertical driving sections $22_A$ and $22_B$. In the pixel array section 21, signal lines $25_1$ to $25_n$ are further arranged along a column direction (direction of arrangement of pixels in pixel columns) for each pixel column in the pixel arrangement of the m rows and the n columns. The signal lines $25_1$ to $25_n$ are connected at one end thereof to respective output terminals in the corresponding columns of the horizontal driving section 23.

The vertical driving sections $22_A$ and $22_B$ include vertical drivers $221_A$ and $221_B$ and V-address latches $222_A$ and $222_B$. The vertical drivers $221_A$ and $221_B$ can arbitrarily select each pixel 4 in the pixel array section 21 in units of pixel rows. The V-address latches $222_A$ and $222_B$ store information on a row address, that is, an address in a vertical (V) direction which address is supplied from the driver IC 3.

The vertical drivers $221_A$ and $221_B$ are formed by a decoder, for example. The vertical drivers $221_A$ and $221_B$ formed by a decoder output a scanning signal for setting each pixel 4 in a pixel row specified by the address information stored in the V-address latches $222_A$ and $222_B$ in an operating state to the pixel row in question on the basis of the address information.

The vertical drivers $221_A$ and $221_B$, which have a decoder configuration, can arbitrarily select a pixel row, that is, perform addressing. Thereby, in rewriting the data of each pixel 4 in the pixel array section 21, it is possible not only to rewrite data in a unit of one screen but also to rewrite data for a particular region (window) by addressing in a unit of a pixel row.

Incidentally, in this case, a configuration is adopted in which the vertical driving sections $22_A$ and $22_B$ are arranged on both of the left side and the right side of the pixel array section 21. However, this is a mere example. That is, a configuration can also be adopted in which a vertical driving section $22_A/22_B$ is disposed on only one of the left side and the right side of the pixel array section 21. However, from a viewpoint of minimizing the propagation delay of the scanning signal output from the vertical driving section $22_A/22_B$, arranging the vertical driving sections $22_A$ and $22_B$ on both of the left side and the right side of the pixel array section 21 is more desirable than disposing the vertical driving section $22_A/22_B$ on only one of the left side and the right side of the pixel array section 21.

As shown in FIG. 2, the horizontal driving section 23 includes a horizontal driver 231 and a buffer circuit 232. The horizontal driving section 23 writes pixel data to each pixel 4 in pixel columns which pixel is selected by the vertical driving sections $22_A$ and $22_B$. A system of writing pixel data by the horizontal driving section 23 includes various systems including a line-sequential system that simultaneously writes pixel data to each pixel 4 in a selected row, a dot-sequential system that writes pixel data to each pixel 4 in a selected row in order in pixel units, and the like.

(Driver IC)

In FIG. 1, the driver IC 3 has a decoder 31, buffer memory (memory section) 32, a rewriting determining circuit 33, an area memory 34, a register 35, a control section 36, and an output circuit 37. As described above, the driver IC 3 is COG-mounted on the same transparent substrate 1 as the TFT circuit section 2. Incidentally, in this case, in regard to the driver IC 3, only minimum necessary functions of the driver IC 3 are shown in a block diagram. The driver IC 3 is not limited to this configuration.

In the driver IC 3, the decoder 31 is supplied with data and an instruction from the external controller 40 via a flexible printed wiring board 50 (see FIG. 2), for example. The data supplied to the decoder 31 is data (image data/pixel data) for rewriting data retained in the memory of each pixel 4 in the pixel array section 21.

The instruction supplied to the decoder 31 is an instruction to rewrite the data of each pixel 4 in the pixel array section 21. This instruction includes information on the timing of starting the rewriting of the data and a region. Specifically, the instruction includes for example region information on a region in which to rewrite data, that is, information on an XY starting address and an XY ending address, and a rewriting command to rewrite the data.

Suppose in this case that the data for the rewriting and the instruction indicating the rewriting (for example a screen refresh command) are transmitted from the external controller 40 to the decoder 31 in time series in order of the data and then the instruction.

The decoder 31 separates the data and the instruction supplied from the external controller 40. The decoder 31 supplies the data to the buffer memory 32, and supplies the instruction to the rewriting determining circuit 33. The buffer memory 32 temporarily stores and retains the data supplied from the external controller 40 via the flexible printed wiring board 50 and the decoder 31 to rewrite the data of each pixel 4 in the pixel array section 21.

As the buffer memory 32, a frame memory capable of storing the data of one screen to be displayed by each pixel 4 in the pixel array section 21, for example, can be used. However, the buffer memory 32 is not limited to a frame memory. When the buffer memory 32 is formed by a frame memory, the buffer memory 32 can store each piece of pixel data for a region in which to rewrite data in for example one-to-one correspondence with the XY address of each pixel 4 in the pixel array section 21.

The rewriting determining circuit 33 determines (interprets) the instruction supplied from the decoder 31. The rewriting determining circuit 33 supplies the area memory 34 with the information on the XY starting address and the XY ending address of the rewriting region which information is included in the instruction. The rewriting determining circuit 33 supplies the register 35 with the screen refresh command indicating the start timing of the rewriting of the data which command is included in the instruction. The area memory 34 stores respective pieces of information on the XY starting address and the XY ending address of the region in which to rewrite the data, which information is supplied from the rewriting determining circuit 33. The register 35 stores the screen refresh command supplied from the rewriting determining circuit 33.

The control section 36 includes a timing generator (TG). The timing generator under control of the control section 36 generates various timing signals determining the timing of writing data to the buffer memory 32 and the timing of reading data from the buffer memory 32 as well as the driving timing of the vertical driving sections $22_A$ and $22_B$ and the horizontal driving section 23.

In rewriting the data of each pixel 4 in the pixel array section 21, for example, the control section 36 starts an operation for rewriting the data on the basis of the screen refresh command stored in the register 35. Then, the control section 36 controls the timing of the various timing signals generated in the timing generator on the basis of the respective pieces of information on the XY starting address and the XY ending address of the region in which to rewrite the data, which information is stored in the area memory 34.

On the basis of the various timing signals supplied from the control section 36, the output circuit 37 reads the data stored in the buffer memory 32, and outputs the data to the TFT circuit section 2, or specifically the horizontal driving section 23 within the TFT circuit section 2. Further, on the basis of the various timing signals supplied from the control section 36, the output circuit 37 outputs a driving signal for driving the vertical driving sections $22_A$ and $22_B$ and the horizontal driving section 23 to the TFT circuit section 2.

[1-2. Pixel Configuration of MIP]

Figure 3:
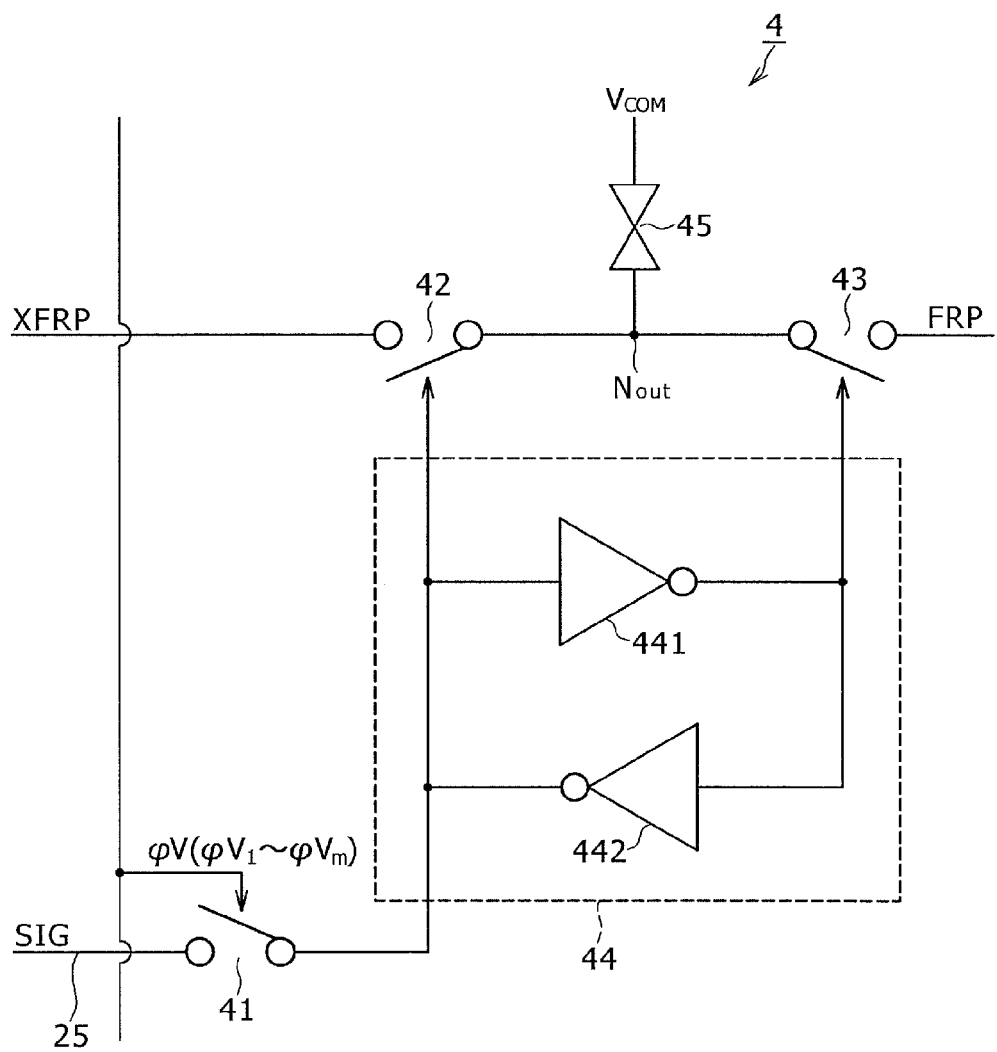
FIG. 3 is a block diagram showing an example of circuit configuration of an MIP pixel.

Description will next be made of details of a circuit configuration of a pixel (MIP pixel) 4 including a memory. FIG. 3 is a block diagram showing an example of a circuit configuration of an MIP pixel 4.

Figure 4:
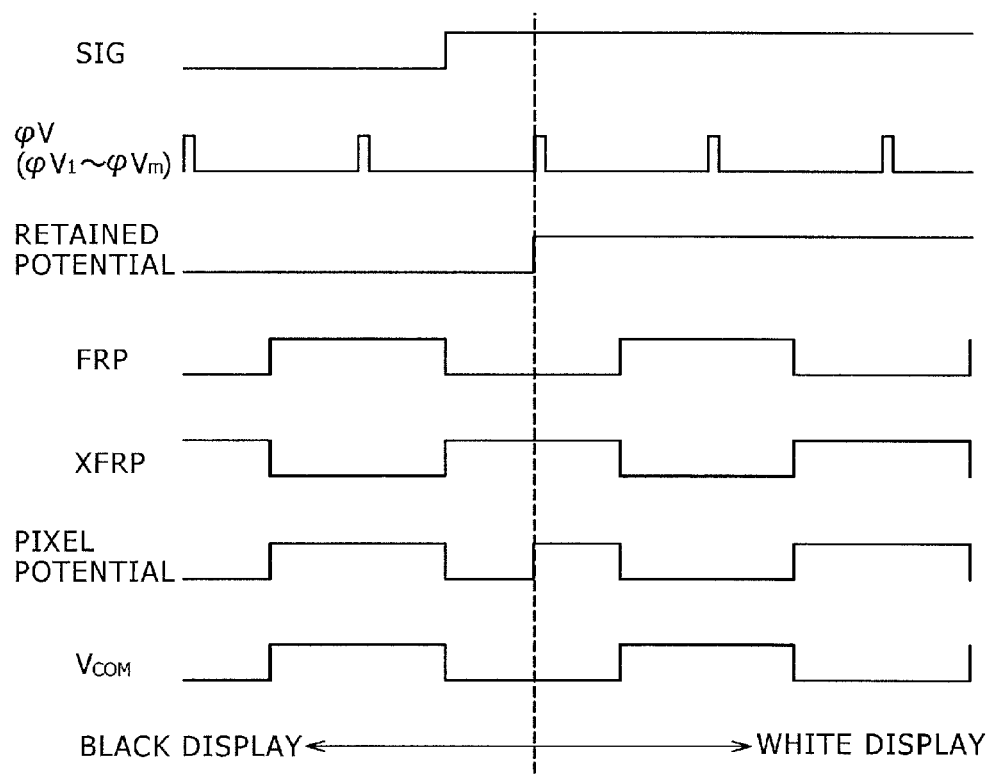
FIG. 4 is a timing chart of assistance in explaining the operation of the MIP pixel.

As shown in FIG. 3, the pixel 4 has a pixel configuration provided with a SRAM function which pixel configuration includes three switch elements 41 to 43, a latch section 44, and a liquid crystal cell 45. The liquid crystal cell 45 in this case represents a liquid crystal capacitance occurring between a pixel electrode and a counter electrode disposed so as to be opposed to the pixel electrode. FIG. 4 is a timing chart of assistance in explaining the operation of the MIP pixel 4.

One terminal of the switch element 41 is connected to a signal line 25 ($25_1$ to $25_n$). The switch element 41 is set in an on (closed) state by being supplied with a scanning signal ΦV (ΦV$_1$ to ΦV$_m$) from the vertical driving sections $22_A$ and $22_B$, and takes in data SIG supplied via a signal line 25 ($25_1$ to $25_n$). The latch section 44 is formed by inverters 441 and 442 connected in parallel with each other in opposite orientations from each other. The latch section 44 retains (latches) a potential corresponding to the data SIG taken in by the switch element 41.

One of the switch elements 42 and 43 is set in an on state according to the polarity of the potential retained by the latch section 44. The switch elements 42 and 43 supply a control pulse FRP in phase with a common potential $V_{COM}$ applied to the counter electrode of the liquid crystal cell 45 or a control pulse XFRP in opposite phase from the common potential $V_{COM}$ to the pixel electrode of the liquid crystal cell 45. A node commonly connected with one terminal of the switch element 42 and one terminal of the switch element 43 is an output node $N_{OUT}$ of the present pixel circuit.

As is clear from FIG. 4, when the potential retained by the latch section 44 has a negative side polarity, the pixel potential of the liquid crystal cell 45 is in phase with the common potential $V_{COM}$, and thus black display is made. When the potential retained by the latch section 44 has a positive side polarity, the pixel potential of the liquid crystal cell 45 is in opposite phase from the common potential $V_{COM}$, and thus white display is made.

Figure 5:
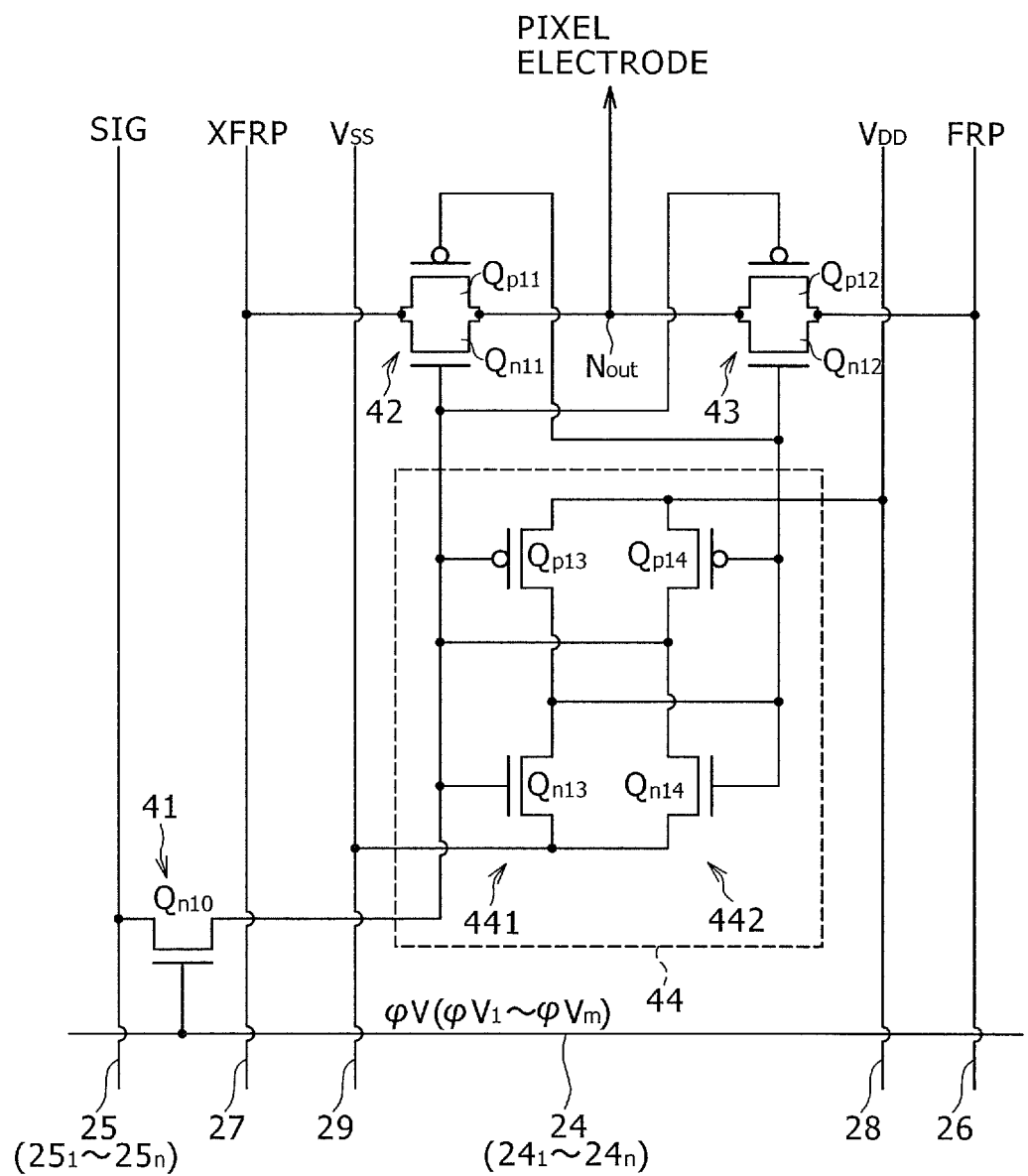
FIG. 5 is a circuit diagram showing an example of a concrete circuit configuration of the MIP pixel.

FIG. 5 is a circuit diagram showing an example of a concrete circuit configuration of the pixel 4. In FIG. 5, parts corresponding to those of FIG. 3 are identified by the same reference numerals.

In FIG. 5, the switch element 41 is formed by an Nch MOS transistor $Q_{n10}$, for example. The Nch MOS transistor $Q_{n10}$ has a source/drain connected to the signal line 25 ($25_1$ to $25_n$), and has a gate connected to a scanning line 24 ($24_1$ to $24_m$).

The switch elements 42 and 43 are both formed by a transfer switch formed by connecting an Nch MOS transistor and a Pch MOS transistor in parallel with each other, for example. Specifically, the switch element 42 has a configuration in which an Nch MOS transistor $Q_{n11}$ and a Pch MOS transistor $Q_{p12}$ are connected in parallel with each other. The switch element 43 has a configuration in which an Nch MOS transistor $Q_{n12}$ and a Pch MOS transistor $Q_{p12}$ are connected in parallel with each other.

The switch elements 42 and 43 do not necessarily need to be a transfer switch formed by connecting an Nch MOS transistor and a Pch MOS transistor in parallel with each other. The switch elements 42 and 43 can also be formed by using a MOS transistor of a single conductivity type, that is, an Nch MOS transistor or a Pch MOS transistor. The common connection node of the switch elements 42 and 43 is the output node $N_{OUT}$ of the present pixel circuit.

The inverters 441 and 442 are both formed by a CMOS inverter, for example. Specifically, the inverter 441 has a configuration in which the gates of an Nch MOS transistor $Q_{n13}$ and a Pch MOS transistor $Q_{p13}$ are commonly connected to each other and the drains of the Nch MOS transistor $Q_{n13}$ and the Pch MOS transistor $Q_{p13}$ are commonly connected to each other. The inverter 442 has a configuration in which the gates of an Nch MOS transistor $Q_{n14}$ and a Pch MOS transistor $Q_{p14}$ are commonly connected to each other and the drains of the Nch MOS transistor $Q_{n14}$ and the Pch MOS transistor $Q_{p14}$ are commonly connected to each other.

Pixels 4 having the above circuit configuration as a basic circuit configuration are spread in a horizontal direction and a vertical direction, and are arranged in the form of a matrix. Control lines 26 and 27 for transmitting the control pulses FRP and XFRP and power supply lines 28 and 29 for a positive side power supply voltage $V_{DD}$ and a negative side power supply voltage $V_{SS}$ are arranged for each column of the arrangement of the pixels 4 in the form of a matrix in addition to the scanning line 24 ($24_1$ to $24_m$) for each row and the signal line 25 ($25_1$ to $25_n$) for each column.

As described above, the active matrix type liquid crystal display device 10 according to the present embodiment has a configuration in which pixels (MIP) 4 provided with a SRAM function which pixels have a latch section 44 for retaining a potential corresponding to display data are arranged in the form of a matrix. Incidentally, while a case of using a SRAM as a memory included in a pixel is taken as an example in the present embodiment, the SRAM is a mere example, and a memory of another configuration, for example a DRAM may also be used.

The active matrix type liquid crystal display device 10 of the MIP system has a memory in each pixel, and can thereby achieve display in the analog display mode and display in the memory display mode, as described above. In the case of the memory display mode, display is made by using pixel data retained in the memory, and it is therefore not necessary to perform an operation of writing a signal potential reflecting a gradation in frame cycles. Thus, the memory display mode has an advantage in that the power consumption of the liquid crystal display device can be reduced.

In addition, there is a need to rewrite the display screen partially, that is, rewrite only a part of the display screen. In this case, it suffices to rewrite pixel data partially. When the display screen is rewritten partially, that is, the pixel data is rewritten partially, data does not need to be transferred to pixels in which the rewriting is not performed. Therefore an amount of data transfer can be reduced. There is thus another advantage in that the power saving of the liquid crystal display device can be achieved.

[1-3. Rewriting Pixel Data]

There is a need to rewrite the display screen partially, that is, rewrite only a part of the display screen in an electronic apparatus including the active matrix type liquid crystal display device 10 of the MIP system. For this need, a system in the past is configured to rewrite the data of pixels 4 from a driver IC 3 periodically (for example in each cycle of 60 Hz) in such a manner as to be synchronized with a synchronizing signal such as a vertical synchronizing signal $V_{sync}$ or the like (hereinafter referred to simply as a "vertical synchronizing signal $V_{sync}$").

That is, the system in the past rewrites pixel data in such a manner as to be synchronized with the vertical synchronizing signal $V_{sync}$. Thus, when display data to be rewritten is input from the external controller 40 to the driver IC 3, display data for one screen is input in synchronism with the vertical synchronizing signal $V_{sync}$ generated on the side of the external controller 40. Alternatively, the vertical synchronizing signal $V_{sync}$ is generated on the side of the driver IC 3 and sent to the side of the external controller 40, and the side of the external controller 40 inputs display data for one screen during a period before a next vertical synchronizing signal $V_{sync}$ arrives.

A reason for this is timing relation between the timing of rewriting the pixel data and the timing of writing the display data from the external controller 40 to the buffer memory 32. That is, when the display data is simply written to the pixels 4 in the timing of the side of the driver IC 3, the former timing and the latter timing may overlap each other, or a state in which the latter timing is ahead of the former timing may occur.

The state in which the latter timing is ahead of the former timing occurs for the following reason. As is understood from a fact that data transfer between the external controller 40 and the driver IC 3 is synchronized with the vertical synchronizing signal $V_{sync}$, communication speed between the external controller 40 and the driver IC 3 is faster than communication speed between the TFT circuit section 2 and the driver IC 3. When the latter timing is ahead of the former timing, display switching is shifted by one frame, so that a display defect such as stripes or the like may occur.

Thus, the system in the past requires the display data input from the outside to be synchronized with the vertical synchronizing signal $V_{sync}$. It is therefore necessary to generate display data for one screen to be newly displayed from now on the outside in advance, and transfer the display data to the driver IC 3. In practice, however, it is inefficient to transfer display data for one screen in synchronism with the vertical synchronizing signal $V_{sync}$ when there is frequently a desire to rewrite a part of the display screen, for example.

Accordingly, the liquid crystal display device 10 of the MIP system according to the present embodiment is configured to perform a rewriting process in arbitrary timing in response to a request to rewrite pixel data which request is received from a client side, that is, the side of the external controller 40, rather than rewriting the pixel data in synchronism with the vertical synchronizing signal $V_{sync}$.

Specifically, first, the display data received from the client (external controller 40) side is data for pixels 4 belonging to a region in which to perform rewriting, rather than data for one screen. The partial display data is temporarily stored in the buffer memory 32. Because the display data retained in the buffer memory 32 is not display data for one screen, the buffer memory 32 does not necessarily need to be a frame memory, that is, a memory capable of storing display data for one screen.

The partial display data for the region in which to perform rewriting is sent from the external controller 40 to the driver IC 3 in time series with an instruction indicating the rewriting. For example, the display data is first sent from the external controller 40 to the driver IC 3, and an instruction (screen refresh command) indicating the rewriting is sent after the passage of a certain time. Receiving the screen refresh command from the external controller 40, the driver IC 3 performs the process of rewriting pixel data on the basis of the display data stored in the buffer memory 32, without the intervention of the vertical synchronizing signal $V_{sync}$ in data transfer between the driver IC 3 and the external controller 40.

Figure 6:
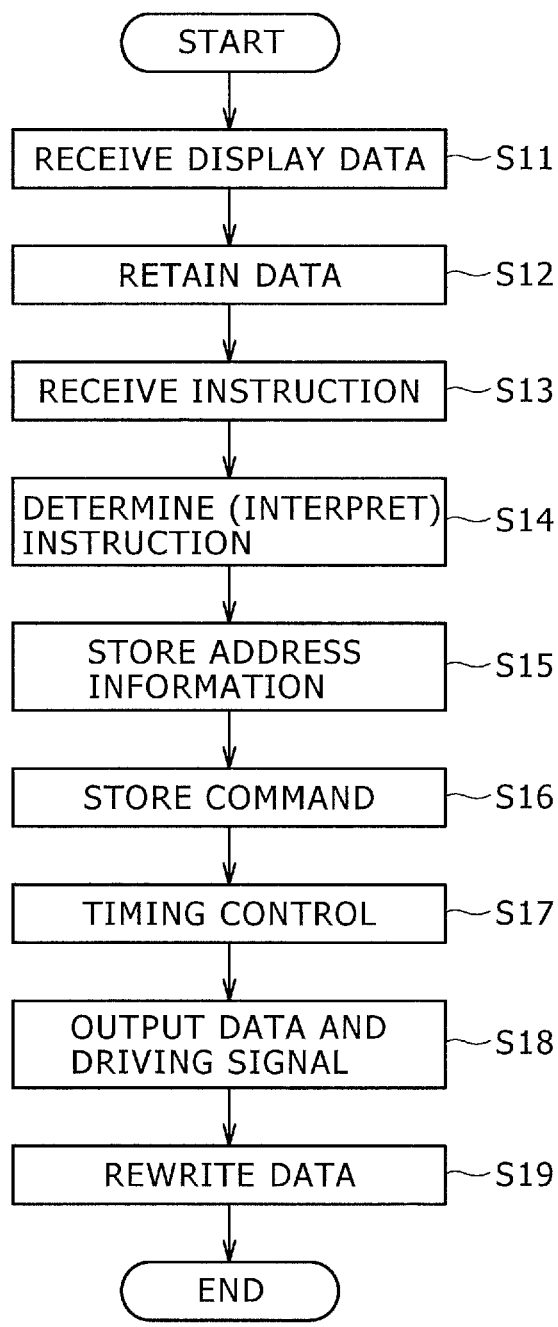
FIG. 6 is a flowchart of a concrete process procedure for partially rewriting pixel data in a driver IC.

A concrete process procedure of the process of partially rewriting pixel data in the driver IC 3 will be described in the following with reference to a flowchart of FIG. 6. This rewriting process is basically a process of the driver IC 3. Data and an instruction are input in time series from the external controller 40 to the driver IC 3.

First receiving display data to be rewritten (step S11), the driver IC 3 writes the display data to the buffer memory 32 to retain the display data in the buffer memory 32 temporarily (step S12). Next, when receiving an instruction indicating rewriting (step S13), the driver IC 3 supplies the instruction to the rewriting determining circuit 33. The rewriting determining circuit 33 determines (interprets) the instruction (step S14).

Then, information on the XY starting address and the XY ending address of a rewriting region which information is included in the instruction is stored in the area memory 34 (step S15). In addition, a screen refresh command as a data rewriting command included in the instruction is stored in the register 35 (step S16).

Next, when the screen refresh command is stored in the register 35, the control section 36 receives the screen refresh command and starts timing control for rewriting data (step S17). Specifically, the control section 36 performs timing control on the timing generator (TG) on the basis of the respective pieces of information on the XY starting address and the XY ending address stored in the area memory 34.

Incidentally, in the case where the buffer memory 32 is a frame memory, it suffices to control a data storing region under control of the control section 36 on the basis of the respective pieces of information on the XY starting address and the XY ending address when the data is temporarily retained in the buffer memory 32.

Next, under control of the control section 36, the data stored in the buffer memory 32 is read and output to the TFT circuit section 2, and a driving signal is output to the vertical driving sections 22$_A$ and 22$_B$ and the horizontal driving section 23 (step S18). Then, pixel data is rewritten in units of pixel rows under the driving of the vertical driving sections 22$_A$ and 22$_B$ and the horizontal driving section 23 (step S19).

Specifically, the vertical driving sections 22$_A$ and 22$_B$ select in order, for example, pixel rows (lines) belonging to the region (window) specified by the respective pieces of information on the XY starting address and the XY ending address. Meanwhile, the horizontal driving section 23 writes the display data supplied from the buffer memory 32 via the output circuit 37 to each pixel 4 in a selected row in synchronism with the selection of the pixel row by the vertical driving sections 22$_A$ and 22$_B$.

The series of processes described above enables a rewriting process to be performed in timing of a rewriting request when the rewriting request is received from the client side, rather than a process of rewriting pixel data in synchronism with the vertical synchronizing signal $V_{sync}$. It is thereby possible to partially input externally input display data to the driver IC 3 rather than display data for one screen without being synchronized with the vertical synchronizing signal $V_{sync}$, and to perform a process of rewriting pixel data in arbitrary timing.

When there is no need for synchronization with the vertical synchronizing signal $V_{sync}$, it is not necessary to generate display data to be rewritten within the period of the vertical synchronizing signal $V_{sync}$ by high-speed processing when the data is generated on the outside, or it is not necessary to transfer data using a frame memory for one screen as the buffer memory 32. It is possible to generate display data to be rewritten and transfer the display data to the driver IC 3 in arbitrary timing, and to rewrite pixel data instantly after a screen refresh instruction. As a result, when regions rewritten in one display screen overlap each other, or when a plurality of windows are rewritten, for example, a phenomenon in which the rewriting of each region is seen for a moment and display blinks (flickers), for example, can be avoided.

As is clear from the description of the operation in the above pixel data rewriting process, the display screen is rewritten in units of pixel rows with a part of the display screen as a window (rectangular region) rather than in a screen unit. The display screen can be rewritten partially because the vertical drivers $221_A$ and $221_B$ are of a decoder configuration, and are thus able to select each pixel row (line) of the pixel array section 21 arbitrarily. The horizontal driver 231 can also be of a decoder configuration to thereby rewrite the display screen partially in pixel units.

Incidentally, in the above example of the pixel data rewriting process, an input instruction is determined, a writing command (for example a screen refresh command) included in the instruction is stored in the register 35, and the control section 36 receives the writing command and performs a process of rewriting pixel data. However, this is a mere example. In an example of another configuration, for example, the control section 36 can be configured to receive the writing command directly from the external controller 40 without the intervention of the rewriting determining circuit 33 and the register 35.

The adoption of such a configuration eliminates a need for the rewriting determining circuit 33 and the register 35, and can therefore simplify the circuit configuration of the driver IC 3. That is, the rewriting determining circuit 33 and the register 35 are not essential constituent requirements of the driver IC 3.

In addition, in the above example, the pixel data rewriting process is described assuming a reflective type liquid crystal display device. However, the rewriting process is also applicable to a transmissive type liquid crystal display device and a transflective type liquid crystal display device in the same manner as in the case of a reflective type liquid crystal display device.

[1-4. Area Ratio Gray Scale Method]

The liquid crystal display device 10 according to the present embodiment adopts an area ratio gray scale method to realize pixel memory multiple-bit colorization. Specifically, the liquid crystal display device 10 according to the present embodiment uses an area ratio gray scale method in which a pixel electrode as the display region of a pixel 4 is divided into a plurality of sub-pixel electrodes weighted in terms of area. Then, a pixel potential selected according to a potential retained by a latch section 24 is applied to the sub-pixel electrodes weighted in terms of area, and gradation display is made by a combination of weighted areas.

In this case, because the liquid crystal display device 10 is a reflective type liquid crystal display device, the sub-pixel electrodes weighted in terms of area correspond to a reflector. Incidentally, in a transmissive type liquid crystal display device, sub-pixel electrodes weighted in terms of area correspond to a transmission window.

The area ratio gray scale method will be concretely described in the following. The area ratio gray scale method is a gradation representing system that represents $2^N$ gradations with N sub-pixel electrodes weighted in area ratio to $2^0$, $2^1, 2^2, \ldots, 2^{N-1}$. The area ratio gray scale method is adopted for a purpose of remedying the nonuniformity of image quality due to variations in TFT characteristics, for example. Suppose that the liquid crystal display device 10 according to the present embodiment adopts an area ratio gray scale method that represents four gradations with two bits by assigning a 2:1 weight to the area (pixel area) of a reflecting electrode as a pixel electrode.

A typical structure for assigning a 2:1 weight to a pixel area is a structure in which the pixel electrode of a pixel 4 is divided into a sub-pixel electrode 41 having an area 1 and a sub-pixel electrode 42 having an area (area 2) twice that of the sub-pixel electrode 41, as shown in FIG. 7A. However, the structure of FIG. 7A is not desirable in terms of gradation representation because the center of gravity of each gradation is not the same as (does not coincide with) the center of gravity of one pixel.

As a structure for making the center of gravity of each gradation the same as the center of gravity of one pixel, there is a structure in which a central part of a sub-pixel electrode 44 having an area 2 is cut out in the shape of a rectangle and a sub-pixel electrode 43 having an area 1 is disposed in the central part of the cut-out rectangular region, as shown in FIG. 7B. In the case of the structure of FIG. 7B, however, coupling parts $44_A$ and $44_B$ of the sub-pixel electrode 44 which coupling parts are situated on both side of the sub-pixel electrode 43 have a narrow width, so that the sub-pixel electrode 44 as a whole has a reduced reflection area, and liquid crystal alignment around the coupling parts $44_A$ and $44_B$ is difficult.

As described above, when a VA (Vertical Aligned) mode in which liquid crystal molecules are substantially perpendicular to a substrate at a time of no electric field is to be set with an area ratio gray scale, a manner of application of voltage to the liquid crystal molecules varies depending on the shape, size, and the like of electrodes, and it is thus difficult to align the liquid crystal in an excellent manner. In addition, gradation design is difficult because an area ratio between the reflecting electrodes is not necessarily a reflectance ratio. Reflectance is determined by the area of the reflecting electrodes, liquid crystal alignment, and the like. In the case of the structure of FIG. 7A, a length ratio between the perimeters of the electrodes is not 1:2 even when the area ratio between the electrodes is 1:2. Thus, the area ratio between the reflecting electrodes is not necessarily a reflectance ratio.

From such a viewpoint, when consideration is given to a gradation representation quality and effective use of a reflection area in the area ratio gray scale method, a pixel electrode is desirably a three-part divided pixel divided into three sub-pixel electrodes 45, $46_A$, and $46_B$ having a same area (size), as shown in FIG. 7C. In the case of this three-part divided pixel, the two upper and lower sub-pixel electrodes $46_A$ and $46_B$ sandwiching the sub-pixel electrode 45 in the middle are formed as a set, and the two sub-pixel electrodes $46_A$ and $46_B$ forming the set are driven simultaneously. Thereby a 2:1 weight can be assigned to the pixel area between the sub-pixel electrode 45 in the middle and the sub-pixel electrodes $46_A$ and $46_B$. In addition, the center of gravity of each gradation can be made to be the same as the center of gravity of one pixel.

However, when each of the three sub-pixel electrodes 45, $46_A$, and $46_B$ is to be brought into electric contact with a driving circuit, the number of contacts of metallic wiring is increased as compared with the structures of FIGS. 7A and 7B, thus increasing the size of the pixel and becoming a factor in hampering the achievement of higher definition. In the case of the MIP pixel configuration having a memory in each pixel 4, in particular, as is clear from FIG. 5, many circuit constituent elements such as transistors and contact parts are present within one pixel 4, and there is not much room in terms of layout area. Thus, one contact part greatly affects the size of the pixel.

Figure 8:
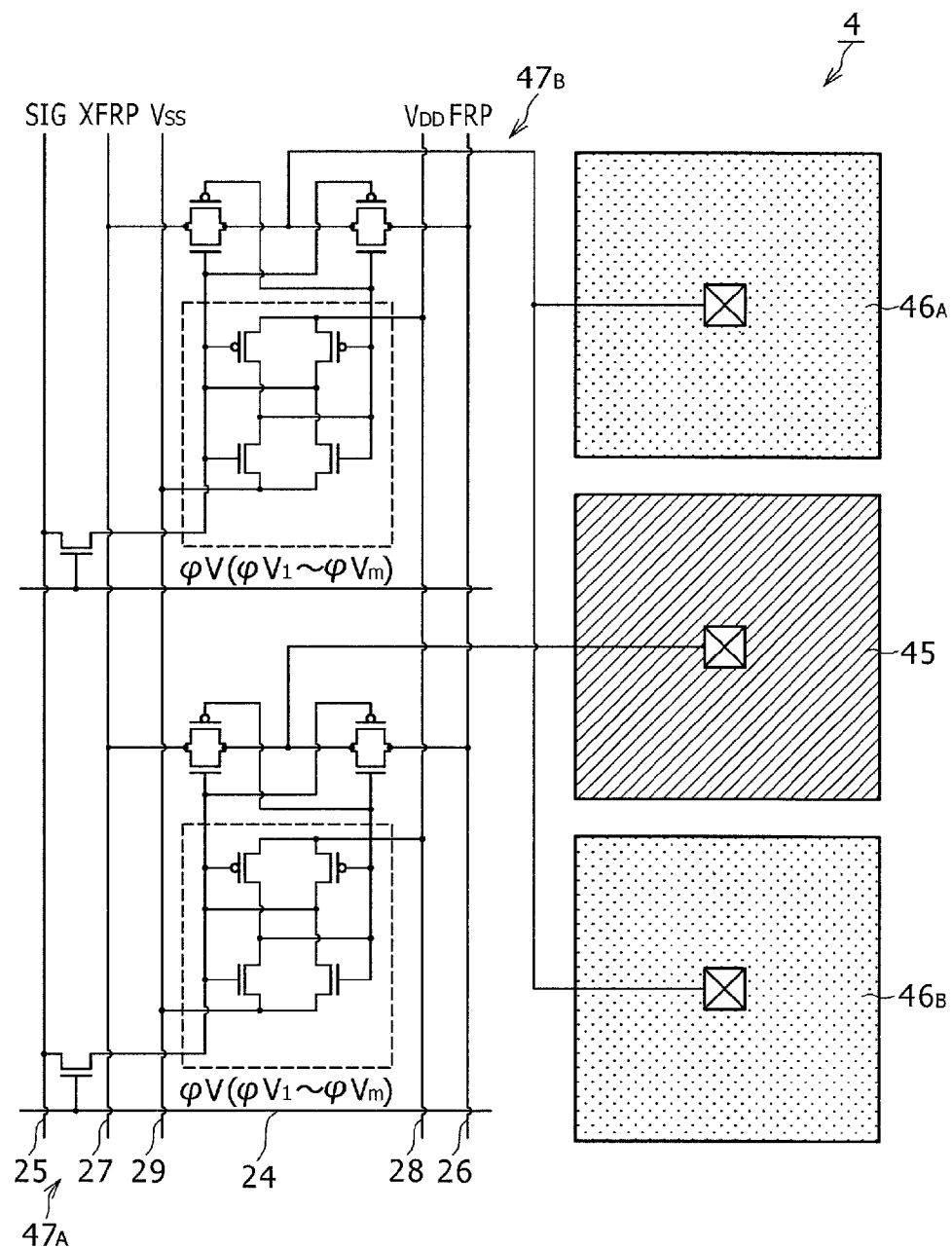
FIG. 8 is a circuit diagram showing correspondences between three sub-pixel electrodes in a three-part divided pixel structure and two sets of driving circuitry.

In order to reduce the number of contacts, it suffices to form a pixel structure in which the two sub-pixel electrodes $46_A$ and $46_B$ made distant from each other by sandwiching the one sub-pixel electrode 45 are electrically coupled (connected) to each other. Then, as shown in FIG. 8, one set of a driving circuit $47_A$ drives the one sub-pixel electrode 45, and another set of a driving circuit $47_B$ simultaneously drives the two other sub-pixel electrodes $46_A$ and $46_B$. In this case, the driving circuits $47_A$ and $47_B$ correspond to the pixel circuit shown in FIG. 5.

Thus, in order to reduce the number of contacts in the case of the pixel structure in which the center of gravity of each gradation is made to be the same as the center of gravity of one pixel using the area ratio gray scale method, the pixel structure in which the two sub-pixel electrodes $46_A$ and $46_B$ distant from each other are electrically coupled to each other is adopted. A method of electrically coupling the two sub-pixel electrodes $46_A$ and $46_B$ to each other includes the following two methods.

One of the methods connects the two sub-pixel electrodes $46_A$ and $46_B$ on a planarizing film to each other by metallic wiring formed under the planarizing film via contact parts formed in the planarizing film. The other method electrically connects the two sub-pixel electrodes $46_A$ and $46_B$ on a planarizing film to each other in an identical plane.

In order to obtain the action and effect of planarization by a planarizing film more reliably, the film thickness of the planarizing film needs to be increased to a certain degree. Thus, in order to form a contact part including a contact hole in the planarizing film, a contact base of a certain size needs to be formed. Therefore, when the former method is adopted, a contact base of a certain size needs to be formed, thus increasing the size of the pixel and becoming a factor in hampering the achievement of higher definition.

On the other hand, when the latter method is adopted, the two sub-pixel electrodes $46_A$ and $46_B$ need to be connected to each other by ITO (Indium Tin Oxide) or another conductor, so that an effective display area (reflection area in a reflective type liquid crystal display device) is reduced. Further, in the case of the VA mode, alignment control is difficult, and gradation design is difficult because the area ratio between the reflecting electrodes is not necessarily a reflectance ratio.

[1-5. Pixel Structure according to Embodiment]

Accordingly, in the present embodiment, in forming a pixel 4 employing the area ratio gray scale method into a three-part divided pixel structure, for example, the following pixel structure is adopted.

In general, a planarizing film for planarization is formed on a substrate on which a circuit section (that is, the TFT circuit section 2 shown in FIG. 2) is formed. The planarizing film in the present embodiment has a double-layer structure formed by laminating a first planarizing film and a second planarizing film in order. Further, metallic wiring is formed between the planarizing films of the double-layer structure, that is, the first and second planarizing films. Then, two electrodes (sub-pixel electrodes $46_A$ and $46_B$) provided on the second planarizing film so as to be separated from each other are electrically connected to each other by the metallic wiring.

In the pixel structure of the above constitution, the planarizing film has a double-layer structure, so that the film thickness of each of the first and second planarizing films can be reduced as compared with the film thickness of the planarizing film of a single-layer structure. The two electrodes (sub-pixel electrodes $46_A$ and $46_B$) provided on the second planarizing film so as to be separated from each other are electrically connected to each other by the metallic wiring between the first and second planarizing films via the second planarizing film.

At this time, because the second planarizing film has a small film thickness, a contact base in forming a contact part for the electric connection in the second planarizing film can be made smaller than in a case of forming a contact part in the planarizing film of the single-layer structure. Thereby, the size of the pixel can be reduced as compared with the case of forming a contact part in the planarizing film of the single-layer structure even when the structure is adopted in which structure the metallic wiring is formed between the planarizing films of the double-layer structure and the two electrodes are electrically connected to each other by the metallic wiring via the second planarizing film.

Thus, the pixel structure in question can provide a pixel structure that does not hamper the achievement of higher definition of a display device. In addition, the metallic wiring for connecting the two electrodes (sub-pixel electrodes $46_A$ and $46_B$) to each other is provided between the two planarizing films of the double-layer structure, and therefore does not reduce an effective display area (reflection area) in the reflective type liquid crystal display device unlike the case in which metallic wiring is provided in the same plane as two electrodes.

Description in the following will be made of a pixel structure according to an embodiment, that is, a concrete example of the pixel structure of a three-part divided pixel, for example, employing the area ratio gray scale method, which pixel structure does not hamper the achievement of higher definition of a display device.

FIRST EXAMPLE

FIGS. 9A and 9B are diagrams of assistance in explaining a pixel structure according to a first example of a three-part divided pixel employing the area ratio gray scale method. FIG. 9A is a plan view of three sub-pixel electrodes. FIG. 9B is a sectional view taken along a line X-X' of FIG. 9A from the direction of arrows. In FIGS. 9A and 9B, parts equivalent to those of FIGS. 7A to 7C and FIG. 8 are identified by the same reference numerals. The substrate of the TFT circuit section 2 and the TFT circuit formed on the substrate are not shown in FIGS. 9A and 9B.

In FIGS. 9A and 9B, a planarizing film is formed into a double-layer structure by laminating a first planarizing film 51 and a second planarizing film 52 in order for the planarization of a substrate (not shown) as a whole on the substrate on which the TFT circuit is formed. Because the planarizing film has the double-layer structure, the film thickness of each of the first and second planarizing films 51 and 52 can be reduced as compared with the film thickness of the planarizing film of a single-layer structure.

Metallic wiring 53 is formed by ITO (Indium Tin Oxide) or another conductive material between the planarizing films of the double-layer structure, that is, the first and second planarizing films 51 and 52. Aluminum (Al), silver (Ag), molybdenum (Mo), or the like can be used as another conductive material.

In this case, of various wiring materials that may be used for the metallic wiring 53, ITO that can be in ohmic contact with silver having a high reflectance is used. However, a metal other than ITO may be selected according to a kind of metal used as a pixel electrode and the like.

Then, on the second planarizing film 52, three sub-pixel electrodes 45, 46$_A$, and 46$_B$ are formed as a reflecting electrode by an electrode material such as silver (Ag), aluminum (Al), or the like. In this case, the three sub-pixel electrodes 45, 46$_A$, and 46$_B$ each have a same size (reflection area). The two upper and lower sub-pixel electrodes 46$_A$ and 46$_B$ sandwiching the sub-pixel electrode 45 in the middle are formed as a set, and the two sub-pixel electrodes 46$_A$ and 46$_B$ forming the set are driven simultaneously. Thereby a 2:1 weight can be assigned to the pixel area by the sub-pixel electrode 45 in the middle and the sub-pixel electrodes 46$_A$ and 46$_B$.

The first planarizing film 51 has a contact part 55 including a contact hole 55$_A$ formed in the first planarizing film 51. The contact part 55 is formed at a position offset from the central position of the sub-pixel electrode 46$_A$.

The wiring material of the metallic wiring 53 forms a conductive layer in the contact hole 55$_A$, and thereby forms the contact part 55 together with the contact hole 55$_A$. The metallic wiring 53 is electrically connected to the TFT circuit section 2, or specifically the driving circuit 47$_B$ shown in FIG. 8, via the contact part 55.

The second planarizing film 52 has contact parts 56 and 57 respectively including contact holes 56$_A$ and 57$_A$ formed in parts corresponding to for example the central positions of the sub-pixel electrodes 46$_A$ and 46$_B$ on the second planarizing film 52. In this case, because the contact parts 56 and 57 are disposed so as to be offset from the contact part 55 of the first planarizing film 51, and the film thickness of the second planarizing film 52 is smaller than the film thickness of the planarizing film of the single-layer structure, the diameter of the contact holes 56$_A$ and 57$_A$ can be made smaller than the diameter of contact holes formed in the planarizing film of the single-layer structure.

The electrode material of the sub-pixel electrodes 46$_A$ and 46$_B$ forms a conductive layer in the contact holes 56$_A$ and 57$_A$, and thereby forms the contact parts 56 and 57 together with the contact holes 56$_A$ and 57$_A$. The sub-pixel electrodes 46$_A$ and 46$_B$ are electrically connected to the metallic wiring 53 via the contact parts 56 and 57.

In the first and second planarizing films 51 and 52 of the double-layer structure, the contact part 56 on the side of the sub-pixel electrode 46$_A$ is formed in a part corresponding to the central position of the sub-pixel electrode 46$_A$, whereas the contact part 55 on the side of the first planarizing film 51 is formed at the position offset from the central position of the sub-pixel electrode 46$_A$. That is, the contact part 55 in the first planarizing film 51 as a lower layer and the contact part 56 in the second planarizing film 52 as an upper layer are disposed at different positions as viewed in plan.

This means that the metallic wiring 53 interposed between the contact part 55 and the contact part 56 allows the contact part 55 on the side of the first planarizing film 51 to be disposed irrespective of the position of the contact part 56 on the side of the second planarizing film 52. Thereby, a degree of freedom of layout of the circuit section connected to the contact part 55, or specifically the driving circuit 47$_B$ shown in FIG. 8, with respect to the sub-pixel electrodes 46$_A$ and 46$_B$ is increased. The same is true for the relation between a contact part 59 and a contact part 60 on the side of the sub-pixel electrode 45.

In the pixel structure according to the first example of the above-described constitution, the sub-pixel electrodes 46$_A$ and 46$_B$ are electrically connected to each other by the metallic wiring 53 via the contact parts 56 and 57, and these sub-pixel electrodes 46$_A$ and 46$_B$ are electrically connected to the driving circuit 47$_B$ via the contact part 55.

The above description has been made of the sub-pixel electrodes 46$_A$ and 46$_B$. The side of the sub-pixel electrode 45 is as follows. As shown in FIG. 9A, the sub-pixel electrode 45 and the driving circuit 47$_A$ shown in FIG. 8 are electrically connected to each other by metallic wiring 58 formed between the planarizing films 51 and 52 of the double-layer structure via the contact parts 59 and 60 formed in the first and second planarizing films 51 and 52.

As described above, according to the pixel structure according to the first example, the planarizing film has the double-layer structure, whereby the film thickness of each of the first and second planarizing films 51 and 52 can be reduced as compared with the film thickness of the planarizing film of the single-layer structure. The two sub-pixel electrodes 46$_A$ and 46$_B$ on the second planarizing film 52 can be electrically connected to each other by the metallic wiring 53 between the planarizing films 51 and 52.

The sub-pixel electrodes 46$_A$ and 46$_B$ also can be connected with more than two wires as shown in FIG. 9C. In this layout, the two sub-pixel electrodes 46$_A$ and 46$_B$ are electrically connected in two ways, which are placed in the both sides of the contact portions 59 and 60. This layout can reduce a defect of a pixel because of breaking of the metal wire 53, which is likely to be caused by, for example, impure dust mixed during a process or strain of the planarizing film 51 or 52. This means even if one side of the wire is broken, the sub-pixel electrodes 46$_A$ and 46$_B$ can be still in electrically contact each other by the other side of the wire 53.

In this case, because the contact parts 56 and 57 are disposed so as to be offset from the contact part 55 in the first planarizing film 51, the film thickness of the contact parts can be reduced. Thus, in establishing the electric connection by the metallic wiring 53, the diameter of the contact holes 56$_A$ and 57$_A$ at the time of forming the contact parts 56 and 57 in the second planarizing film 52 can be reduced. Thereby, the contact bases of the contact parts 56 and 57 can be reduced in size, and therefore the size of the pixel is not increased.

In the pixel structure according to the first example, the pixel electrode of one pixel 4 is divided into the three sub-pixel electrodes 45, 46$_A$, and 46$_B$ of the same size, the two upper and lower sub-pixel electrodes 46$_A$ and 46$_B$ are driven simultaneously as a set, and a 2:1 weight is assigned to the pixel area, whereby four gradations are represented with two bits. In the pixel structure of the three-part divided pixel employing the area ratio gray scale method, the positions of the centers of gravity of the respective higher-order and lower-order bits, that is, the position of the center of gravity of display by the sub-pixel electrodes 46$_A$ and 46$_B$ and the position of the center of gravity of display by the sub-pixel electrode 45 are the same (coincide with each other).

When the positions of the centers of gravity of the respective bits are thus the same in the pixel structure employing the area ratio gray scale method, excellent gradation display can be achieved as compared with the case of a pixel structure in which the positions of the centers of gravity of the respective bits are not the same. While description is made by taking the pixel structure of the three-part divided pixel as an example in this case, this is not limited to the pixel structure of the three-part divided pixel. That is, even in the pixel structures of pixels divided into four or more parts, when the positions of the centers of gravity of respective bits are the same, better gradation display can be achieved.

SECOND EXAMPLE

As has also been described above, when the VA (Vertical Aligned) mode is to be set with an area ratio gray scale, a manner of application of voltage to liquid crystal molecules varies depending on the shape, size, and the like of electrodes, and it is thus difficult to align the liquid crystal in an excellent manner. In addition, gradation design is difficult because an area ratio between sub-pixel electrodes (reflecting electrodes) is not necessarily a reflectance ratio. A pixel structure according to a second example to be described in the following is made in view of these points.

FIGS. 10A and 10B are diagrams of assistance in explaining a pixel structure according to a second example of a three-part divided pixel employing the area ratio gray scale method. In FIGS. 10A and 10B, parts equivalent to those of FIGS. 9A and 9B are identified by the same reference numerals. FIG. 10A is a plan view of three sub-pixel electrodes. FIG. 10B is a sectional view taken along a line Y-Y' of FIG. 10A from the direction of arrows.

The pixel structure according to the second example is basically the same as the pixel structure according to the first example in terms of a constitution for electrically connecting two sub-pixel electrodes $46_A$ and $46_B$ to each other. That is, the pixel structure according to the second example has a constitution in which a planarizing film has a double-layer structure, metallic wiring 53 is formed between the first and second planarizing films 51 and 52 of the double-layer structure, and the two sub-pixel electrodes $46_A$ and $46_B$ on the second planarizing film 52 are electrically connected to each other by the metallic wiring 53.

In addition to this constitution, the pixel structure according to the second example has alignment factors 61, 62, and 63 for controlling vertical alignment. The alignment factors 61, 62, and 63 are one of alignment controlling sections referred to as VAPs (Vertical Alignment Protrusions). The alignment factors 61, 62, and 63 act to define a direction in which liquid crystal molecules fall, that is, to trigger the falling of the liquid crystal molecules in a certain direction when an electric field is applied.

The alignment factors 61, 62, and 63, that is, the VAPs 61, 62, and 63 are provided in the respective central parts of a sub-pixel electrode 45 in the middle and the two sub-pixel electrodes $46_A$ and $46_B$. The second planarizing film 52 has a contact part 60 in a part corresponding to the central position of the sub-pixel electrode 45 in the middle, and has contact parts 56 and 57 in parts corresponding to the respective central positions of the two sub-pixel electrodes $46_A$ and $46_B$.

That is, the respective arrangement positions of the VAPs 61, 62, and 63 coincide with the respective arrangement positions of the contact parts 60, 56, and 57. In other words, in the pixel structure according to the second example, the contact parts 60, 56, and 57 provided in the second planarizing film 52 are used as (double as) the VAPs 61, 62, and 63.

As described above, the pixel structure according to the second example has the VAPs 61, 62, and 63 in the respective central parts of the sub-pixel electrode 45 in the middle and the two sub-pixel electrodes $46_A$ and $46_B$ sandwiching the sub-pixel electrode 45 in the middle, in employing the VA mode with an area ratio gray scale. The adoption of such a constitution provides the following action and effect in addition to the action and effect of the pixel structure according to the first example.

Because the three divided sub-pixel electrodes 45, $46_A$, and $46_B$ have a same electrode shape, and each of the sub-pixel electrodes 45, $46_A$, and $46_B$ has uniform electric field distribution, the VAPs 61, 62, and 63 can act to trigger the falling of liquid crystal molecules in a certain direction when an electric field is applied. As a result, excellent liquid crystal alignment can be achieved. In addition, because the contact parts 60, 56, and 57 double as the VAPs 61, 62, and 63, the VAPs 61, 62, and 63 do not need to be provided separately.

However, the VAPs 61, 62, and 63 are not limited to the constitution in which the contact parts 60, 56, and 57 double as the VAPs 61, 62, and 63. The VAPs 61, 62, and 63 may have another constitution, such for example as a constitution in which holes are formed in the metallic wiring 53 and metallic wiring 58 and the holes are used as the VAPs 61, 62, and 63. Further, projections may be provided to form the VAPs 61, 62, and 63. In any case, the VAPs 61, 62, and 63 are desirably situated in the respective central parts of the three sub-pixel electrodes 45, 46A, and $46_B$.

In the second embodiment, the sub-pixel electrodes $46_A$ and $46_B$ also can be connected with more than two wires as shown in FIG. 10C, as described in the first embodiment.

The pixel structure according to the above embodiment has been described by taking as an example a case where the pixel structure is applied to a liquid crystal display device whose pixels include a memory (MIP pixels). However, the pixel structure is not limited to this example of application. That is, the pixels may or may not have the MIP pixel structure. In the case of the MIP pixel structure, however, many circuit constituent elements such as transistors and the like and contact parts are present within one pixel, and circuit density is high, so that there is not much room in terms of layout area. Thus, from a viewpoint of achieving higher definition, the pixel structure according to the embodiment does not increase the number of contacts or the number of pieces of wiring and is thus able to exert the action and effect of the pixel structure perfectly by being applied to a display device of the MIP pixel structure.

In addition, in regard to a technical matter of making a planarizing film have a double-layer structure, forming metallic wiring between two planarizing films of the double-layer structure, and electrically connecting two electrodes disposed on the planarizing film as an upper layer to each other by the metallic wiring, a liquid crystal display device to which the present technology is applied may or may not have a pixel structure employing the area ratio gray scale method. That is, the present technology is applicable to liquid crystal display devices in general that employ a constitution in which two electrodes disposed on a planarizing film are electrically connected to each other.

[1-6. Specular Reflection]

Specular reflection is ideal for the sub-pixel electrodes 45, $46_A$, and $46_B$ as a reflector (reflecting electrode) in the reflective type liquid crystal display device, or preferably the reflective type liquid crystal display device using a front scattering film (dimming film). In an ordinary liquid crystal display device, however, a planarizing film is formed on projections and depressions of wiring formed as a driving circuit, that is, wiring of the pixel array section 21 in particular of the TFT circuit section 2 in FIG. 2, and a reflecting electrode is formed on the planarizing film.

Thus, reflectance and contrast are degraded by scattering factors such for example as:

Residual surface roughness due to the projections and depressions of the wiring of the circuit, Projections and depressions due to wiring directly under the reflecting electrode, and Parts of contact with the pixel electrode and a tapered region around the pixel electrode.

Figure 11:
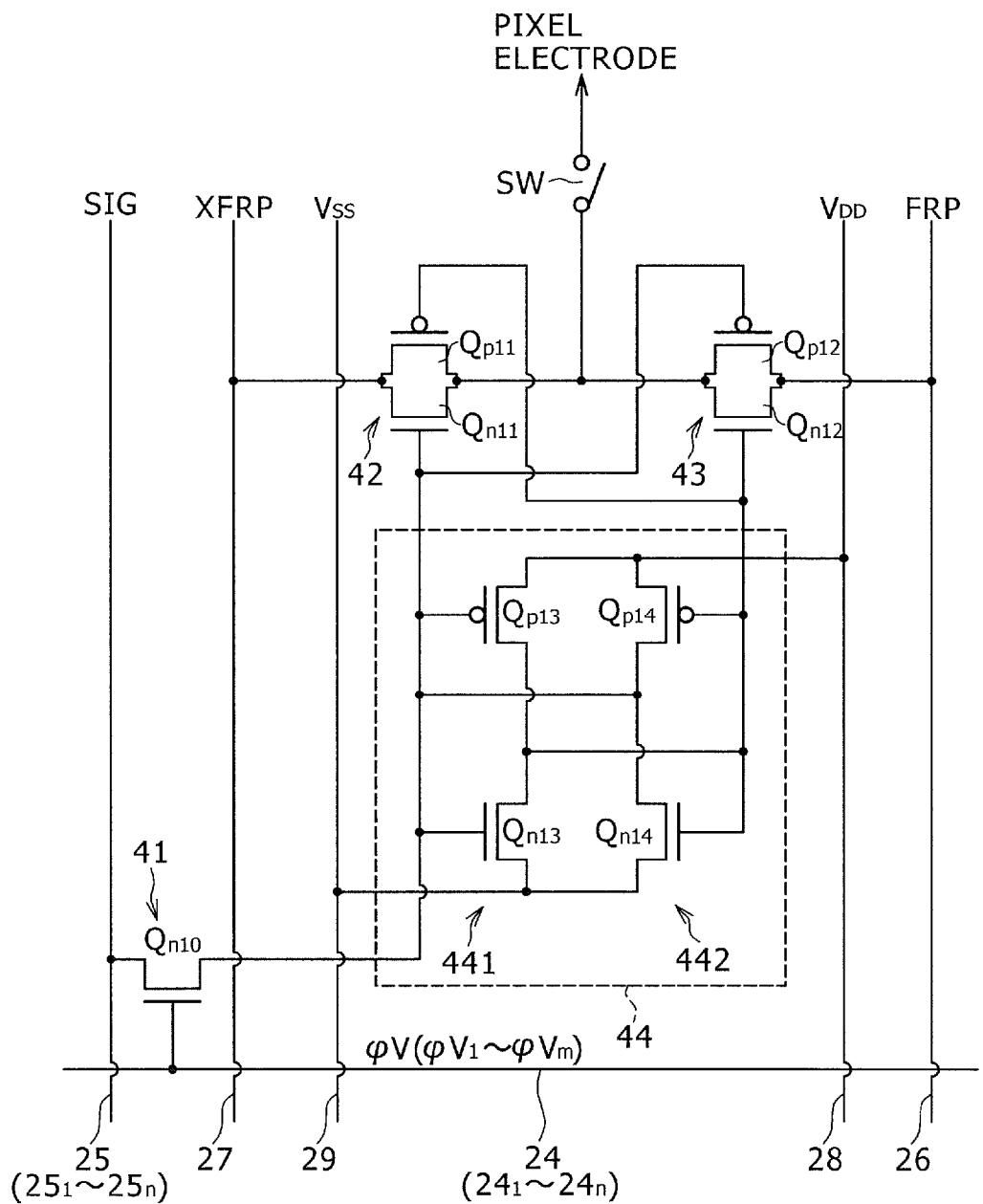
FIG. 11 is a diagram of assistance in explaining a switch element for selectively supplying power to a pixel electrode.

In addition, in applying an area ratio gray scale, in order to arrange sub-pixels without limitation, all pixels need a switch element SW for selectively supplying power to the pixel electrodes, as shown in FIG. 11. A transistor, for example a thin film transistor (TFT) can be used as the switch element SW. The circuit density of the pixel array section 21 is increased by an amount corresponding to an increase in the number of switch elements SW for each pixel 4.

[1-7. Pixel Array Substrate Structure according to Embodiment]

Accordingly, in the present embodiment, in applying an area ratio gray scale in a reflective type liquid crystal display device, a pixel array substrate (TFT array substrate) structure is as follows.

First, a planarizing film formed for a purpose of the planarization of the pixel array substrate structure on a substrate on which a circuit section, that is, a TFT circuit section 2 is formed has a double-layer structure formed by laminating a first planarizing film and a second planarizing film (corresponding to the planarizing films 51 and 52 in FIG. 9) in order. In addition, relay wiring is formed between the first and second planarizing films of the double-layer structure. This relay wiring electrically connects a first contact part formed in the first planarizing film and connected to the TFT circuit section 2 to a second contact part formed at a position different from that of the first contact part as viewed in plan in the second planarizing film.

In the pixel array substrate structure of the above constitution, the planarizing film formed on the substrate has the double-layer structure, and is thereby able to planarize the surface roughness due to the projections and depressions of the wiring of the circuit more reliably than in the case of the planarizing film of the single-layer structure. In addition, even when the circuit density of the TFT circuit section 2 to which the first contact part is connected is increased, the interposition of the relay wiring between the first contact part and the second contact part prevents the arrangement position of the second contact part from being limited by the circuit pattern of the TFT circuit section 2. In other words, the second contact part formed in the second planarizing film can be laid out freely.

Thus, because the surface roughness due to the projections and depressions of the wiring of the circuit can be planarized more reliably, and the second contact part formed in the second planarizing film can be laid out freely so as not to affect image quality, a reflective type liquid crystal display device of high display quality can be provided. An example of a pixel array substrate structure according to an embodiment will be concretely described in the following with reference to drawings.

(Substrate Structure)

Figure 12:
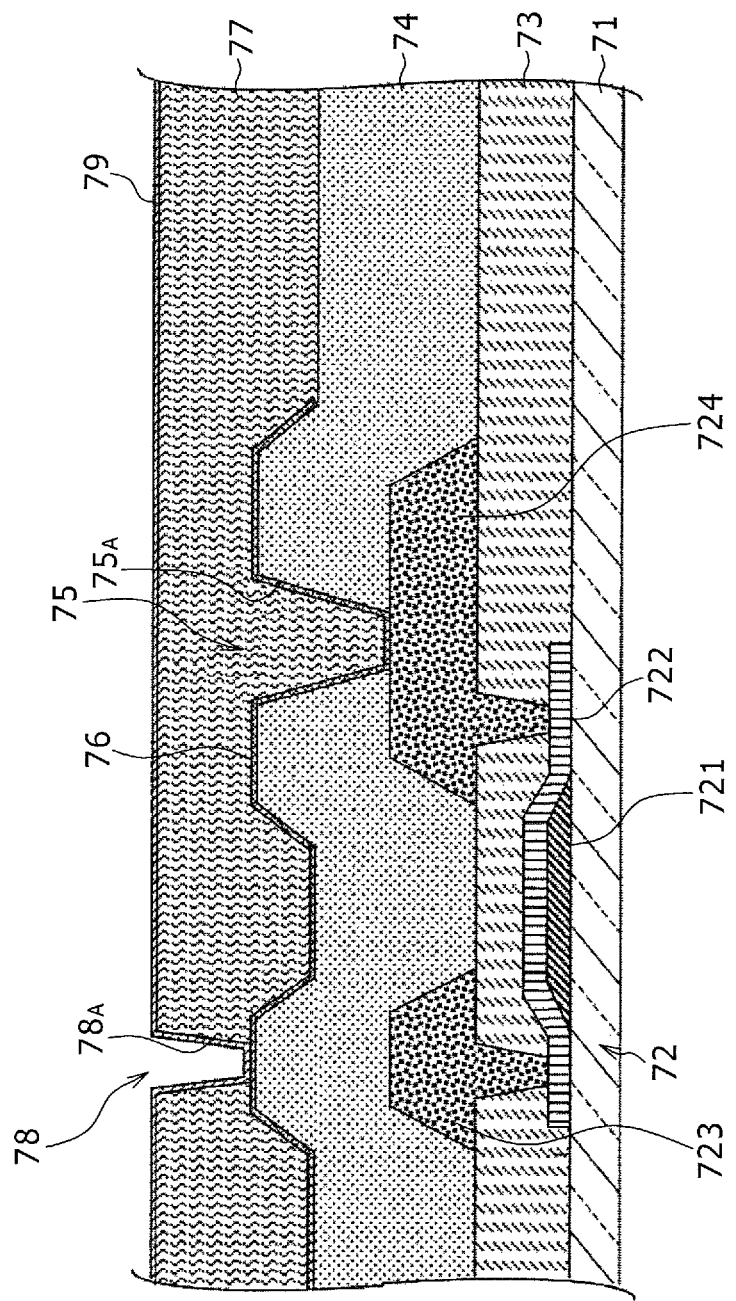
FIG. 12 is a sectional view of principal parts representing a concrete example of a pixel array substrate structure according to an embodiment.

FIG. 12 is a sectional view of principal parts representing a concrete example of a pixel array substrate structure according to an embodiment.

In FIG. 12, a circuit section including a transistor 72 is formed on the surface of a transparent substrate (base material) 71. A glass substrate, for example, is used as the transparent substrate 71. A TFT (Thin Film Transistor), for example, is used as the transistor 72. That is, the circuit section including the transistor 72 corresponds to the TFT circuit section 2 in FIG. 1 and FIG. 2. A large number of pixel regions are provided in the form of an array on the transparent substrate 71, and transistors 72 are formed so as to correspond to respective pixels 4.

The transistor 72 illustrated in this case functions as a switch element for controlling the supply of power to the pixel electrode provided for each pixel 4. That is, the transistor 72 corresponds to the switch element SW in FIG. 11. Though not shown in FIG. 12, the transistors and the like constituting the pixel circuit (driving circuit) having the memory function shown in FIG. 5 are also included in the TFT circuit section 2 formed on the transparent substrate 71.

The transistor (TFT) 72 has a configuration having a gate electrode 721 formed on the transparent substrate 71 and having a semiconductor layer 722 constituting an active layer formed on the gate electrode 721. The central part of the semiconductor layer 722 forms a channel region, and both ends of the semiconductor layer 722 form source/drain regions. The source/drain regions at both ends of the semiconductor layer 722 are electrically connected to source/drain electrodes 723 and 724 formed of a conductive material such as Al (aluminum), Ti (titanium), or the like via an insulating film 73.

The upper surface of the transparent substrate 71 on which the TFT circuit section 2 including the transistor 72 is formed has projections and depressions due to the presence of metallic wiring including the source/drain electrodes 723 and 724. In order to planarize the projections and depressions, a first planarizing film 74 is formed so as to cover the TFT circuit section 2 including the transistor 72. The first planarizing film 74 corresponds to the first planarizing film 51 in FIG. 9. A contact hole $75_A$ is formed in the first planarizing film 74.

Relay wiring 76 is formed on the first planarizing film 74 by forming a thin conductive film such for example as ITO or the like and making the thin conductive film into a desired circuit pattern by photolithography or the like. The ITO forming the relay wiring 76 is formed also on the inner wall of the contact hole $75_A$ formed in the first planarizing film 74, and thereby forms a first contact part 75 for electrically connecting the relay wiring 76 and the transistor 72 to each other.

A second planarizing film 77 is formed on the first planarizing film 74 so as to cover the relay wiring 76 as a circuit pattern. The second planarizing film 77 corresponds to the second planarizing film 52 in FIG. 9. A contact hole $78_A$ is formed in the second planarizing film 77. This contact hole $78_A$ is laid out in a position different from that of the contact hole $75_A$ formed in the first planarizing film 74 as viewed in plan.

A pixel electrode 79 is formed as a reflecting electrode on the second planarizing film 77 by forming a thin conductive film having a high reflectance such as Ag (silver), Al (aluminum), or the like and making the thin conductive film into a desired pixel electrode pattern by photolithography or the like. The pixel electrode 79 corresponds to the sub-pixel electrode 45 and the sub-pixel electrodes $46_A$ and $46_B$ in FIG. 9.

The Ag, for example, forming the pixel electrode 79 is formed also on the inner wall of the contact hole $78_A$ formed in the second planarizing film 77, and thereby forms a second contact part 78 for electrically connecting the relay wiring 76 and the pixel electrode 79 to each other. Because the contact hole $78_A$ is laid out at a position different from that of the contact hole $75_A$ as viewed in plan, the second contact part 78 is also laid out at a different position from that of the first contact part 75 as viewed in plan, as a matter of course.

The second contact part 78 formed in the second planarizing film 77 is a scatter reflection region, that is, an optically ineffective region, and thus affects image quality. The size and the layout position of the second contact part 78 are therefore important in improving the display quality of the liquid crystal display device.

As described above, in the pixel array substrate structure according to the present embodiment, the planarizing film formed on the transparent substrate 71 for the purpose of planarizing the surface of the substrate has the double-layer structure formed by laminating the first planarizing film 74 and the second planarizing film 77 in order. The double-layer structure can planarize circuit roughness, that is, surface roughness due to the projections and depressions of wiring more reliably than in the case of the planarizing film of the single-layer structure, and can planarize the level differences of the relay wiring 76 by the second planarizing film 77.

Being able to planarize the surface of the substrate more in this case means that a pixel electrode 79 having a high degree of flatness can be formed as a reflecting electrode. Because the pixel electrode 79 having a high degree of flatness can be formed, the reflective type liquid crystal display device can provide a high reflectance and a high contrast as compared with the structure in the past using the planarizing film of the single-layer structure.

Figure 13A:
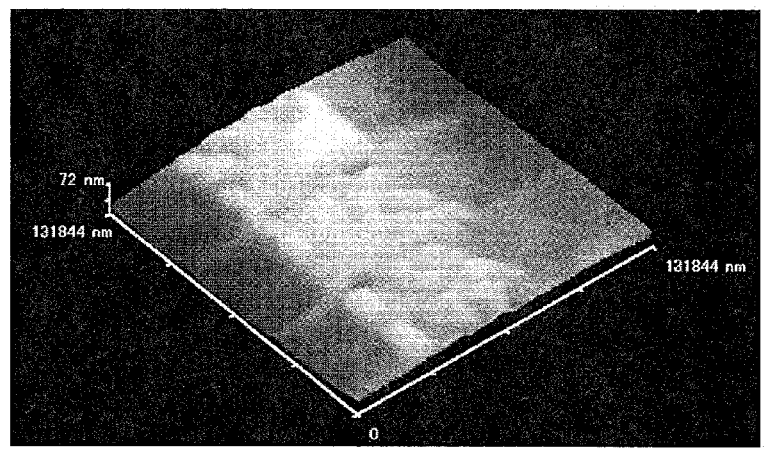
FIGS. 13A and 13B are diagrams for comparison between a case (FIG. 13A) of the planarizing film of a double-layer structure and a case (FIG. 13B) of the planarizing film of a single-layer structure in regard to roughness of the surface of a substrate after the planarizing film is formed on the TFT substrate having a pixel structure including a memory and a pixel electrode is formed on the planarizing film.
Figure 13B:
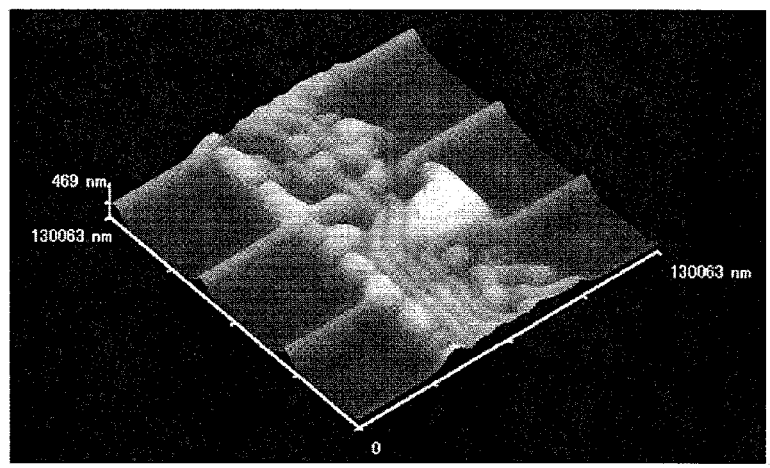

FIGS. 13A and 13B are diagrams for comparison between a case (FIG. 13A) of the planarizing film of the double-layer structure and a case (FIG. 13B) of the planarizing film of the single-layer structure in regard to roughness of the surface of the substrate after the planarizing film is formed on the TFT substrate having the pixel structure including a memory and the pixel electrode is formed on the planarizing film. In this case, no contact holes are formed for the purpose of the comparison of planarizing effects, and measurement results obtained by measuring surface roughness with an atomic force microscope (AFM) are shown.

In FIGS. 13A and 13B, $R_a$ denotes variations (surface roughness of the surfaces), and $R_{pv}$ denotes a maximum height difference (peak to valley height difference). As shown in FIG. 13A, when the planarizing film has the double-layer structure, the surface of the substrate appears to be a specular surface. On the other hand, as shown in FIG. 13B, when the planarizing film has the single-layer structure, the surface of the substrate is a rough surface.

In addition, because the first contact part 75 and the second contact part 78 are laid out at different positions, and connection between the first contact part 75 and the second contact part 78 is established by the relay wiring 76, routing the relay wiring 76 depending on the layout positions of the contact parts 75 and 78 does not invite complication of the TFT circuit section 2. On the other hand, in the case of the structure in the past in which the planarizing film has the single-layer structure, routing wiring under the planarizing film depending on the layout position of the contact part connected to the pixel electrode invites complication of the TFT circuit section 2 because the wiring in question is the wiring of the TFT circuit section 2.

In addition, the relay wiring 76 connecting the first contact part 75 and the second contact part 78 to each other prevents the layout position of the second contact part 78 from being limited by the circuit pattern of the TFT circuit section 2 even when the circuit density of the TFT circuit section 2 is increased. In other words, the second contact part 78 formed in the second planarizing film 77 and producing an effect on image quality, can be laid out freely so as to reduce the effect on image quality. That is, the arrangement position of the second contact part 78 can be set arbitrarily with respect to the arrangement position of the first contact part 75.

Further, because the planarizing film has the double-layer structure, the film thickness of each of the first and second planarizing films 74 and 77 can be reduced as compared with the film thickness of the planarizing film of the single-layer structure. Thereby, the diameter of the contact holes $75_A$ and $78_A$ formed in the first and second planarizing films 74 and 77 can be reduced. Because the diameter of the contact hole $78_A$ formed in the second planarizing film 77, in particular, can be reduced, the effect on image quality can be minimized, and coupled with the action and effect of the relay wiring 76, one or more small-size contact parts can be laid out freely in the second planarizing film 77.

Thus, according to the pixel array substrate structure according to the present embodiment, the surface roughness due to the projections and depressions of the wiring of the circuit can be planarized more reliably, and the second contact part 78 formed in the second planarizing film 77 can be freely laid out in a small size and in such a manner as not to affect image quality. As a result, according to the pixel array substrate structure according to the present embodiment, a reflective type liquid crystal display device of high display quality can be provided.

(Manufacturing Method)

A method for manufacturing the pixel array substrate structure according to the present embodiment will next be described with reference to a flowchart of FIG. 14.

First, a TFT circuit section 2 including a transistor (TFT) 72 is formed on a transparent substrate (base material) 71 (step S21). Next, a first planarizing film 74 is formed by applying, exposing, developing, and firing a material for the first planarizing film 74 (step S22).

FIG. 15A is a plan pattern view schematically showing a plan pattern of a pixel circuit in a state in which the first-layer planarizing film (first planarizing film) 74 is formed. FIG. 15B is a sectional structural view taken along a line A-A' of the plan pattern view (FIG. 15A).

The plan pattern view of FIG. 15A corresponds to a circuit configuration using two ($47_A$ and $47_B$) pixel circuits (driving circuits) including a memory as shown in FIG. 5 for three sub-pixel electrodes 45, $46_A$, and $46_B$, as shown in FIG. 8. In relation to the circuit configuration of FIG. 5, the switch elements 41 to 43 and the latch section 44 of a pixel 4 including a memory are formed by using transistors, or specifically TFTs. In this case, a configuration in which the switch elements 42 and 43 are formed by a MOS transistor of a single conductivity type is shown.

In the first-layer planarizing film (first planarizing film) 74, a contact part is formed in a part corresponding to the output node $N_{OUT}$ in FIG. 5. This contact part corresponds to the contact parts 55 and 59 in FIGS. 9A and 9B. That is, as is clear from the plan pattern view of FIG. 15A, in particular, two contact parts (55 and 59) are present in the state of the first-layer planarizing film 74 being formed.

As a next process, a thin conductive film such as ITO or the like is formed on the first planarizing film 74 (step S23), and then patterned into a desired circuit pattern by photolithography or the like, whereby relay wiring 76 is formed (step S24). Next, a second planarizing film 77 is formed on the first planarizing film 74 so as to cover the relay wiring 76 by applying, exposing, developing, and firing a material for the second planarizing film 77 (step S25).

Next, a thin conductive film having a high reflectance such as Ag/Al or the like is formed on the second planarizing film 77 (step S26), and then patterned into a desired pixel electrode pattern by photolithography or the like, whereby a pixel electrode 79 as a reflecting electrode is formed (step S27). The pixel array substrate structure according to the present embodiment is formed by the above series of processes. Thereafter the process proceeds to a cell process.

FIG. 16A is a plan pattern view schematically showing a plan pattern of a pixel circuit in a state in which the pixel electrode 79 is formed. FIG. 16B is a sectional structural view taken along a line B-B' of the plan pattern view (FIG. 16A).

As is clear from FIG. 16A, a total of three contact parts (60, 56, and 57), that is, one contact part in the central part of the sub-pixel electrode 45 and one contact part in each of the central parts of the sub-pixel electrodes $46_A$ and $46_B$ are present in the state of the pixel electrode 79 being formed.

(Materials for Planarizing Films)

Next, materials for the first and second planarizing films 74 (51) and 77 (52), or specifically materials for the planarizing films 74 and 77 which materials are suitable for the double-layer structure will be described.

It is known that a material having a high melt flow property is very effective in obtaining a high degree of flatness with the planarizing film of the single-layer structure. However, when a material having a high melt flow property is used, a contact hole formed in the planarizing film is widened due to a melt flow at a time of high-temperature firing. The widened region of the contact hole is a scatter reflection region, that is, an optically ineffective region. The melt flow is one of measures indicating the fluidity or processability of a polymer in a state of a solution.

Accordingly, the first planarizing film 74 is formed of a material having a high melt flow property for the first layer, the relay wiring 76 is formed on the planarizing film 74, and thereafter the second planarizing film 77 is formed of a material having a low melt flow property for the second layer in contrast with the first layer. At this time, the glass transition temperature $T_g$ of the planarizing film 77 in the second layer is made higher than a firing temperature T in a firing process after the development of the planarizing film 77 in the second layer.

In this case, a material whose glass transition temperature $T_g$ is higher than the firing temperature T ($T_g > T$) is regarded as a material having a low melt flow property, and a material whose glass transition temperature $T_g$ is equal to or lower than the firing temperature T ($T_g \leq T$) is regarded as a material having a high melt flow property. The glass transition temperature $T_g$ is a temperature at which a thermodynamic derivative quantity exhibits a more or less sudden change from a crystal-like value to a liquid-like value when the temperature is changed.

Figure 17A:
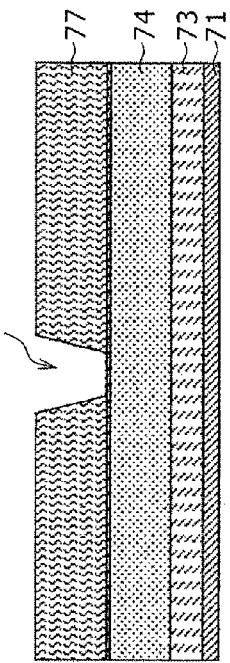
FIGS. 17A, 17B, and 17C are diagrams of assistance in explaining the melt flow property of a planarizing film in a second layer.

This melt flow property becomes a problem in the process of step S25 in the manufacturing process described earlier (see FIG. 14), that is, the process of applying, exposing, developing, and firing the material for the planarizing film 77 in the second layer. Specifically, as shown in FIG. 17A, the planarizing film 77 in the second layer applied on the planarizing film 74 in the first layer is exposed and developed, and thereafter fired at the firing temperature T. A large difference occurs in terms of an optically ineffective region as a scatter reflection region depending on the melt flow property of the material.

Figure 17C:
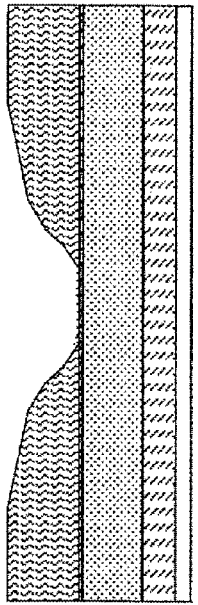
Figure 17B:
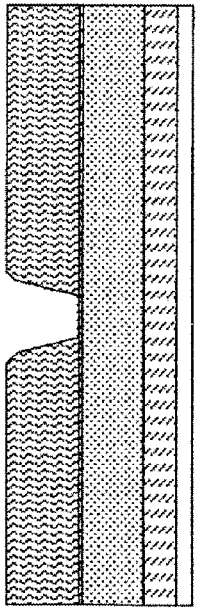

Specifically, when the material for the planarizing film 77 in the second layer is a material having a low melt flow property, that is, a material whose glass transition temperature $T_g$ is higher than the firing temperature T (FIG. 17B), the widening of a contact hole formed in the planarizing film 77 (which contact hole corresponds to the contact hole $78_A$ in FIG. 12) due to high-temperature firing can be suppressed. On the other hand, when the material for the planarizing film 77 in the second layer is a material having a high melt flow property, that is, a material whose glass transition temperature $T_g$ is equal to or lower than the firing temperature T (FIG. 17C), the contact hole is widened due to a melt flow at the time of high-temperature firing.

Figure 18B:
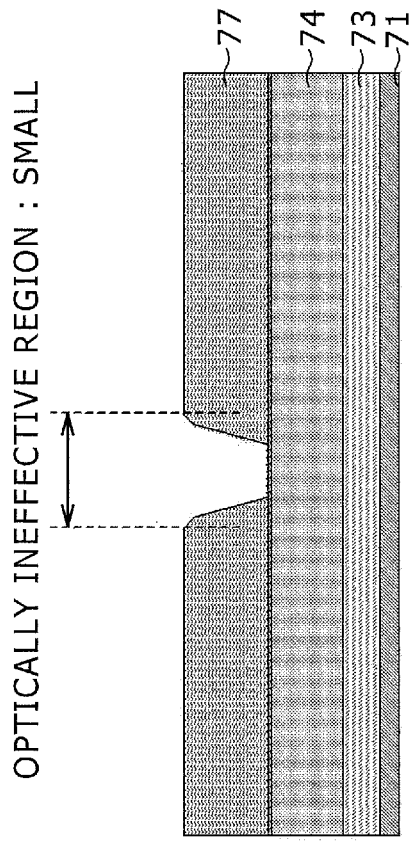
FIGS. 18A and 18B are diagrams of assistance in explaining a case in which a material for the planarizing film in the second layer is a material having a low melt flow property.
Figure 18A:
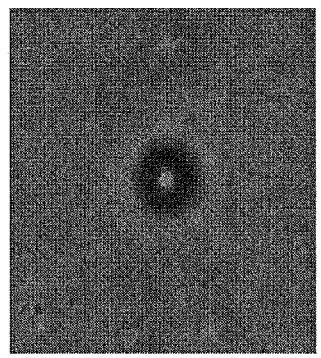

FIGS. 18A and 18B show a state of a contact hole when the material for the planarizing film 77 in the second layer is a material having a low melt flow property. FIG. 18A shows a surface microscope image of the contact hole in epi-illumination in which light reflected by a sample is magnified and observed. FIG. 18B shows a section of the contact hole. It is shown that the use of a material having a low melt flow property as the material for the planarizing film 77 in the second layer can suppress the widening of the contact hole due to high-temperature firing, thus resulting in a small optically ineffective region as a scatter reflection region.

Figure 19A:
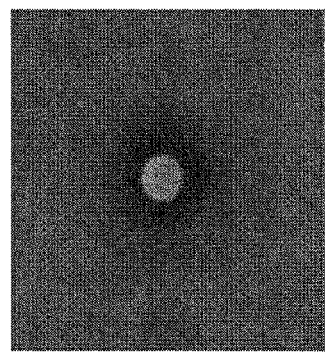
FIGS. 19A and 19B are diagrams of assistance in explaining a case in which a material for the planarizing film in the second layer is a material having a high melt flow property.
Figure 19B:
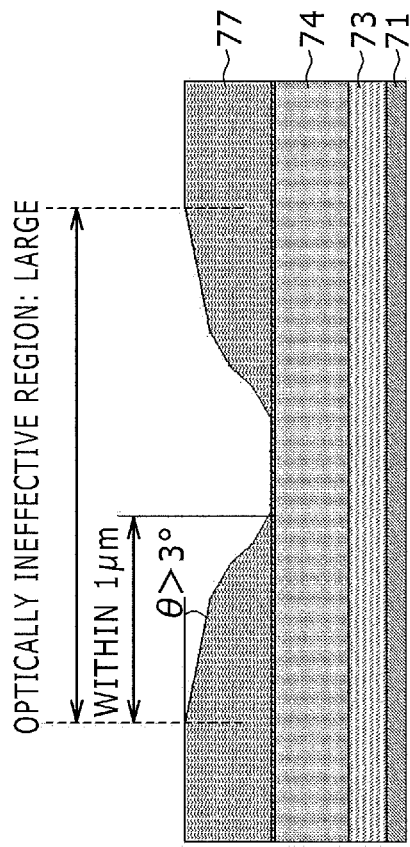

FIGS. 19A and 19B show a state of a contact hole when the material for the planarizing film 77 in the second layer is a material having a high melt flow property. FIG. 19A shows a surface microscope image of the contact hole in epi-illumination. FIG. 19B shows a section of the contact hole. It is shown that the use of a material having a high melt flow property as the material for the planarizing film 77 in the second layer widens the contact hole due to a melt flow at the time of high-temperature firing, thus resulting in a larger optically ineffective region as compared with the case of using a material having a low melt flow property.

Thus using a material having a low melt flow property whose glass transition temperature $T_g$ is higher than the firing temperature T as the planarizing film 77 in the second layer can suppress the widening of the contact hole formed in the planarizing film 77 due to high-temperature firing, and can therefore reduce the widening region of the contact hole. This reduces an optically ineffective region as a scatter reflection region having an effect on image quality, and thus greatly contributes to an improvement in display quality of the display device.

The pixel array substrate structure according to the above embodiment has been described by taking as an example a case where the pixel array substrate structure is applied to a liquid crystal display device whose pixels have the MIP pixel structure. However, the pixel array substrate structure is not limited to this example of application. That is, the pixels may or may not have the MIP pixel structure. However, the application of the pixel array substrate structure according to the present embodiment to a liquid crystal display device of the MIP pixel structure can provide the following unique action and effect.

The MIP pixel structure has many circuit constituent elements such as transistors and the like and contact parts within one pixel. Thus, the MIP pixel structure has high circuit density, and a layout structure on the TFT array substrate is complicated. When the pixel array substrate structure according to the present embodiment is adopted in forming a pixel electrode as a reflecting electrode on such a TFT array substrate, the layout of a contact part having an effect on image quality can be freely determined in design with the relay wiring 76 formed on the first-layer planarizing film 74. It is consequently possible to lower the circuit density, and to make design specialized for the side of a pixel memory and a pixel switch (corresponding to the switch element SW in FIG. 11).

<2. Examples of Modification>

In the foregoing embodiments, description has been made by taking as an example a case in which the present technology is applied to a liquid crystal display device. However, in regard to technical matters other than the technical matter of providing a VAP (alignment factor) in each of the central parts of sub-pixel electrodes, the present technology is not limited to application to liquid crystal display devices of the VA system and further application to liquid crystal display devices in general. That is, the present technology can be applied not only to liquid crystal display devices in general but also to display devices in general using an organic EL (electroluminescence) element, an inorganic EL element, an LED (Light Emitting Diode) element, a semiconductor laser element, and the like as an electrooptic element (light emitting element) of a pixel.

At this time, the pixel may or may not be a pixel including a memory (MIP pixel). In the case of the MIP pixel structure, however, many circuit constituent elements such as transistors and the like and contact parts are present within one pixel 4, and there is not much room in terms of layout area. Thus, from a viewpoint of achieving higher definition, the present technology does not increase the number of contacts or the number of pieces of wiring and is thus able to exert the action and effect of the present technology perfectly by being applied to a display device of the MIP pixel structure. In addition, in that case, the present technology is applicable also to display devices in which MIP is combined with an organic EL element, an inorganic EL element, an LED element, a semiconductor laser element, and the like, of course.

In addition, in regard to a technical matter of making a planarizing film have a double-layer structure, forming metallic wiring between two planarizing films of the double-layer structure, and electrically connecting two electrodes disposed on the planarizing film as an upper layer to each other by the metallic wiring, a display device to which the present technology is applied may or may not have a pixel structure employing the area ratio gray scale method. That is, the present technology is applicable to display devices in general that employ a constitution in which two electrodes disposed on a planarizing film are electrically connected to each other.

Further, in the foregoing embodiments, description has been made by taking as an example a case in which the present technology is applied to a reflective type liquid crystal display device. However, the present technology is not limited to application to reflective type liquid crystal display devices. That is, in regard to the respective technical matters of the rewriting of pixel data, the pixel structure, and the pixel array substrate structure, the present technology is similarly applicable to transmissive type liquid crystal display devices and transflective type liquid crystal display devices as, in the case of reflective type liquid crystal display devices. In regard to the technical matter of the pixel array substrate structure, however, the present technology can more perfectly exert the action and effect thereof when applied to a reflective type liquid crystal display device because the present technology can achieve more specular reflection of sub-pixel electrodes as a reflecting electrode.

<3. Electronic Apparatus>

A display device according to an embodiment of the present technology described above is applicable as display devices of electronic apparatuses in all fields that display a video signal input thereto or a video signal generated therein as an image or video. For example, a display device according to an embodiment of the present technology is applicable as display devices of various electronic apparatuses shown in FIGS. 20 to 22G, such for example as display devices of digital cameras and video cameras and display devices of portable terminal devices such as portable telephones, PDAs (Personal Digital Assistants), electronic books, and the like.

A display device according to an embodiment of the present technology includes a display device in the form of a sealed module. For example, a display module formed by attaching a counter part such as a transparent glass or the like to a pixel array section corresponds to a display device in the form of a sealed module. This transparent counter part may be provided with a color filter, a protective film, and the like. Incidentally, the display module may be provided with a circuit part, an FPC (Flexible Printed Circuit), and the like for externally inputting or outputting a signal and the like to the pixel array section.

Concrete examples of electronic apparatuses to which the present technology is applied will be described in the following.

Figure 20A:
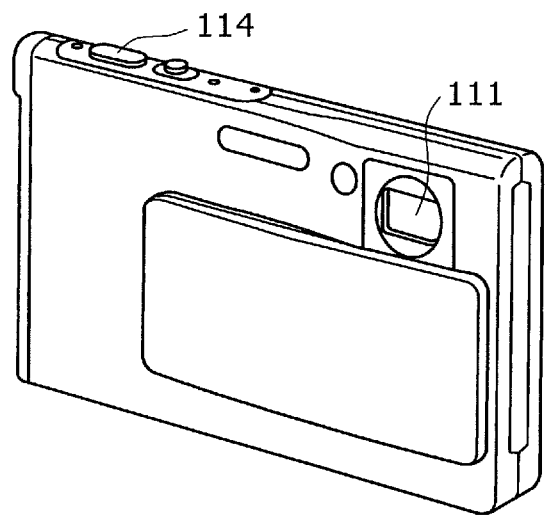
FIGS. 20A and 20B are perspective views of an external appearance of a digital camera to which the present technology is applied, FIG. 20A being a perspective view of the digital camera as viewed from a front side, and FIG. 20B being a perspective view of the digital camera as viewed from a back side.
Figure 20B:
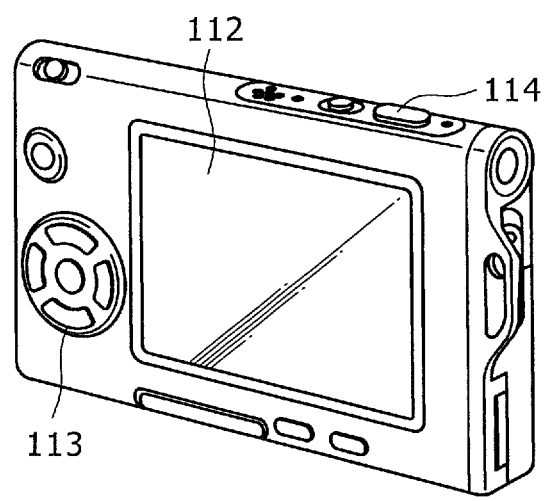

FIGS. 20A and 20B are perspective views of an external appearance of a digital camera to which the present technology is applied. FIG. 20A is a perspective view of the digital camera as viewed from a front side. FIG. 20B is a perspective view of the digital camera as viewed from a back side. The digital camera according to the present example of application includes a light emitting part 111 for flashlight, a display part 112, a menu switch 113, a shutter button 114, and the like. The digital camera is fabricated using a display device according to an embodiment of the present technology as the display part 112.

Figure 21:
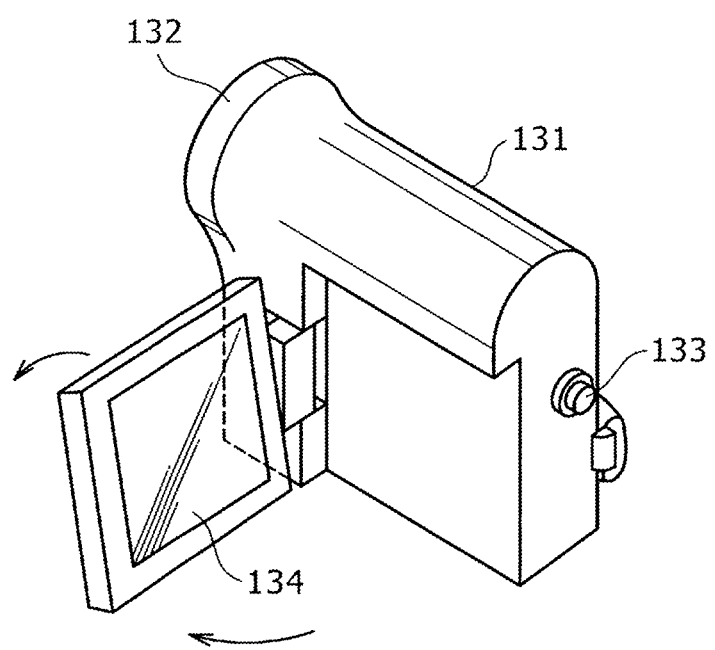
FIG. 21 is a perspective view of an external appearance of a video camera to which the present technology is applied.

FIG. 21 is a perspective view of an external appearance of a video camera to which the present technology is applied. The video camera according to the present example of application includes a main unit 131, a lens 132 for taking a subject which lens is in a side surface facing frontward, a start/stop switch 133 at a time of picture taking, a display part 134, and the like. The video camera is fabricated using a display device according to an embodiment of the present technology as the display part 134.

FIGS. 22A, 22B, 22C, 22D, 22E, 22F, and 22G are external views of a portable terminal device, for example a portable telephone to which the present technology is applied. FIG. 22A is a front view of the portable telephone in an opened state. FIG. 22B is a side view of the portable telephone in the opened state. FIG. 22C is a front view of the portable telephone in a closed state. FIG. 22D is a left side view of the portable telephone in the closed state. FIG. 22E is a right side view of the portable telephone in the closed state. FIG. 22F is a top view of the portable telephone in the closed state. FIG. 22G is a bottom view of the portable telephone in the closed state. The portable telephone according to the present example of application includes an upper side casing 141, a lower side casing 142, a coupling part (a hinge part in this case) 143, a display 144, a sub-display 145, a picture light 146, a camera 147, and the like. The portable telephone according to the present example of application is fabricated using a display device according to an embodiment of the present technology as the display 144 and the sub-display 145.

In the above, a portable telephone is taken as an example of a portable terminal device. However, as described above, the present technology is applicable to display devices of various portable terminal devices such as PDAs, electronic books, and the like. When a display device according to an embodiment of the present technology is a reflective type liquid crystal display device, in particular, the reflective type liquid crystal display device does not need power for emitting light on the inside, and therefore when used as a display device of a portable terminal device frequently used outdoors, the reflective type liquid crystal display device provides an advantage of being able to reduce the power consumption of the portable terminal device greatly. The same is true for digital cameras and video cameras frequently used outdoors.

The present technology contains subject matter related to that disclosed in Japanese Priority Patent Application JP 2010-287668 filed in the Japan Patent Office on Dec. 24, 2010, and Japanese Priority Patent Application JP 2010-

283487 filed in the Japan Patent Office on Dec. 20, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A pixel structure configured for area ratio grey scale, the pixel structure comprising:
   a first planarizing film and a second planarizing film laminated in order on a substrate on which a circuit section is formed, the first and second planarizing films being positioned further from the substrate than a layer including the circuit section;
   at least three electrodes disposed to be separated from each other on the second planarizing film; and
   metallic wiring for electrically connecting first electrodes that are two electrodes of the at least three electrodes, the metallic wiring being formed between said first planarizing film and said second planarizing film,
   wherein the circuit section includes at least two drive circuits,
   the first electrodes are electrically connected to a first drive circuit that is one of the at least two drive circuits, and the first drive circuit drives the first electrodes; and
   a second electrode is one of the electrodes other than the first electrodes,
   the second electrode is connected electrically to a second drive circuit that is one of the drive circuits other than the first drive circuit, and the second drive circuit drives the second electrode.

2. The pixel structure according to claim 1, wherein the first electrodes perform the area ratio gray scale displaying a gradation by an area combination with the second electrode.

3. The pixel structure according to claim 2, wherein on the area ratio gray scale, positions of centers of gravity of respective bits are same.

4. The pixel structure according to claim 2, wherein the first electrodes perform a 2:1 area ratio gray scale by an area combination with the second electrode.

5. The pixel structure according to claim 4, wherein respective sizes of the firsts electrodes and the second electrode are equal.

6. The pixel structure according to claim 5, wherein the first electrodes are disposed with the second electrode interposed between the first electrodes.

7. The pixel structure according to claim 5, wherein said pixel structure employs a vertical alignment mode making liquid crystal molecules substantially perpendicular to the substrate at a time of no electric field, and
   respective central parts of the at least three electrodes have an alignment factor for controlling vertical alignment.

8. The pixel structure according to claim 7, wherein said second planarizing film has a contact part in each of parts corresponding to central positions of the at least three electrodes.

9. The pixel structure according to claim 8, wherein said contact part is used as said alignment factor.

10. The pixel structure according to claim 4, wherein said circuit section has the first driving circuit that simultaneously drives the first electrodes and the second driving circuit that drives the second electrode in each pixel.

11. The pixel structure according to claim 10, wherein said first planarizing film includes a first contact part for electrically connecting said one driving circuit to said metallic wiring, and
    said second planarizing film includes a second contact part for electrically connecting the first electrodes to said metallic wiring.

12. The pixel structure according to claim 11, wherein said second contact part is disposed at a position different from said first contact part as viewed in plan.

13. The pixel structure according to claim 12, wherein said second contact part is disposed in parts corresponding to central positions of the first electrodes in said second planarizing film.

14. The pixel structure according to claim 1, wherein said circuit section has a memory for retaining data in each pixel.

15. The pixel structure according to claim 1, wherein the metallic wiring includes at least two wires connecting between the first contact part and the second contact part.

16. A display device formed by arranging a pixel having a pixel structure configured for area ratio gray scale, said pixel structure comprising:
    a first planarizing film and a second planarizing film laminated in order on a substrate on which a circuit section is formed, the first and second planarizing films being positioned further from the substrate than a layer including the circuit section;
    at least three electrodes disposed to be separated from each other on he second planarizing film; and
    metallic wiring for electrically connecting first electrodes that are two electrodes of the at least three electrodes, the metallic wiring being formed between said first planarizing film and said second planarizing film,
    wherein the circuit section includes at least two drive circuits,
    the first electrodes are electrically connected to a first drive circuit that is one of the at least two drive circuits, and the first drive circuit drives the first electrodes; and
    a second electrode is one of the electrodes other than the first electrodes,
    the second electrode is connected electrically to a second drive circuit that is one of the drive circuits other than the first drive circuit, and the second drive circuit drives the second electrode.

17. An electronic apparatus having a display device formed by arranging a pixel having a pixel structure configured for area ratio gray scale, said pixel structure comprising:
    a first planarizing film and a second planarizing film laminated in order on a substrate on which a circuit section is formed, the first and second planarizing films being positioned further from the substrate than a layer including the circuit section;
    at least three electrodes disposed to be separated from each other on the second planarizing film; and
    metallic wiring for electrically connecting first electrodes that are two electrodes of the at least three electrodes, the metallic wiring being formed between said first planarizing film and said second planarizing film,
    wherein the circuit section includes at least two drive circuits,
    the first electrodes are electrically connected to a first drive circuit that is one of the at least two drive circuits, and the first drive circuit drives the first electrodes; and
    a second electrode is one of the electrodes other than the first electrodes the second electrode is connected electrically to a second drive circuit that is one of the drive circuits other than the first drive circuit, and the second drive circuit drives the second electrode.

18. The display device according to claim 16, wherein the first electrodes perform the area ratio gray scale displaying a gradation by an area combination with the second electrode.

19. The electronic apparatus according to claim 17, wherein the first electrodes perform the area ratio gray scale displaying a gradation by an area combination with the second electrode.

* * * * *